(12) United States Patent
Fujishiro et al.

(10) Patent No.: US 10,945,235 B2
(45) Date of Patent: Mar. 9, 2021

(54) MOBILE COMMUNICATION SYSTEM

(71) Applicant: KYOCERA Corporation, Kyoto (JP)

(72) Inventors: Masato Fujishiro, Yokohama (JP); Hiroyuki Urabayashi, Yokohama (JP); Chiharu Yamazaki, Tokyo (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 9 days.

(21) Appl. No.: 16/364,222

(22) Filed: Mar. 26, 2019

(65) Prior Publication Data

US 2019/0223156 A1 Jul. 18, 2019

Related U.S. Application Data

(63) Continuation of application No. PCT/JP2017/035175, filed on Sep. 28, 2017.

(60) Provisional application No. 62/402,293, filed on Sep. 30, 2016.

(51) Int. Cl.
*H04W 72/00* (2009.01)
*H04W 76/15* (2018.01)
*H04W 4/06* (2009.01)
*H04L 29/06* (2006.01)
*H04W 4/70* (2018.01)

(52) U.S. Cl.
CPC ....... *H04W 72/005* (2013.01); *H04L 65/4076* (2013.01); *H04W 4/06* (2013.01); *H04W 76/15* (2018.02); *H04W 4/70* (2018.02)

(58) Field of Classification Search
CPC ..... H04W 72/005; H04W 76/15; H04W 4/06; H04W 4/70; H04W 76/40; H04W 76/27; H04L 65/4076
See application file for complete search history.

(56) References Cited

U.S. PATENT DOCUMENTS

2018/0048985 A1* 2/2018 Park ........................... H04L 1/08
2019/0182802 A1* 6/2019 Yu ...................... H04W 72/1289
2019/0230564 A1* 7/2019 Kim ......................... H04W 4/06

OTHER PUBLICATIONS

Nokia et al., On Multicast Support for NB-IoT, 3GPP TSG-RAN WG1, Meeting #86, R1-166591, Aug. 22-26, 2016, pp. 1-3, Gothenburg, Sweden.

* cited by examiner

*Primary Examiner* — Alex Skripnikov
*Assistant Examiner* — Sharmin Chowdhury
(74) *Attorney, Agent, or Firm* — Studebaker & Brackett PC

(57) ABSTRACT

A first radio terminal transmits and receives a radio signal by using a limited frequency band limited to a bandwidth of a predetermined number of resource blocks. A second radio terminal transmits and receives a radio signal by using a frequency band wider than the limited frequency band. A base station transmits configuration information of SC-MTCH by SC-MCCH. The base station sets a first period to the first radio terminal and sets a second period shorter than the first period to the second radio terminal as an SC-MCCH change period in which the configuration information of the SC-MTCH can be changed. The base station receives an MBMS interest indication from the first radio terminal, the first radio terminal being in a connected mode, and determines whether or not to shift the first radio terminal to an idle mode based on the MBMS interest indication.

5 Claims, 23 Drawing Sheets

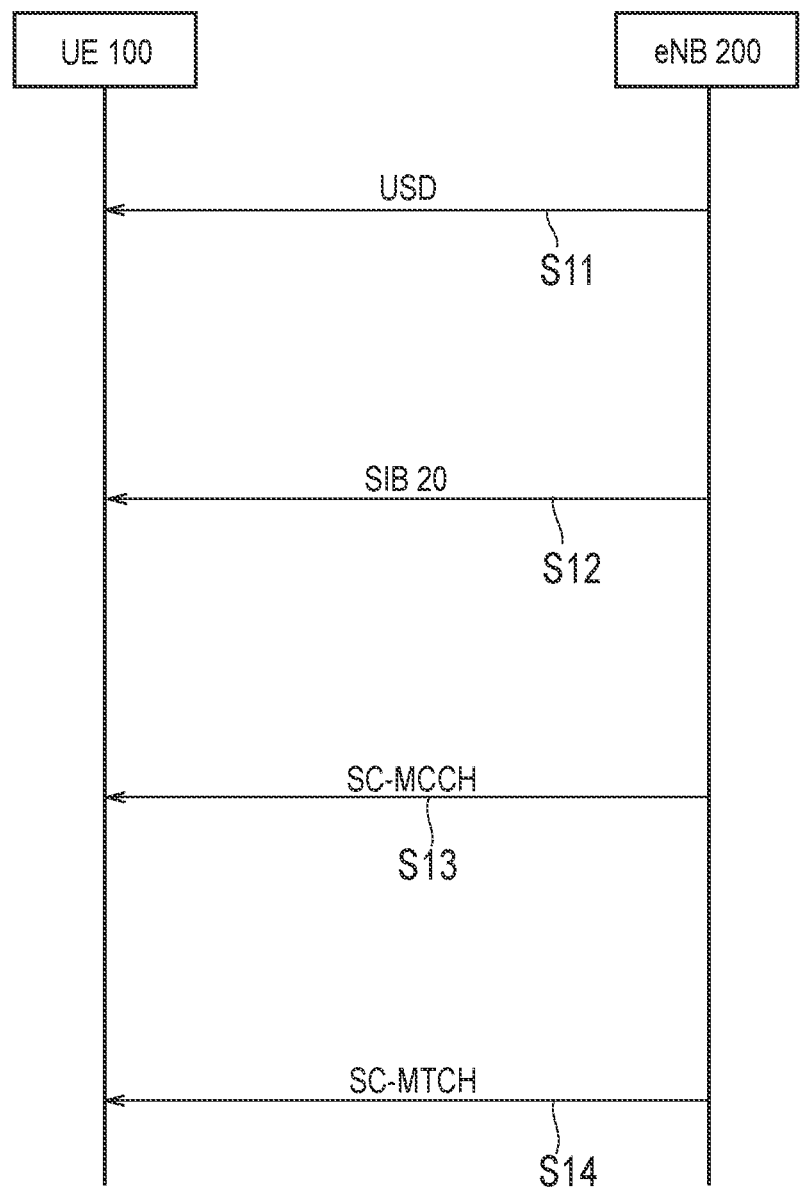

FIG. 9

SystemInformationBlockType20 information element

```
-- ASN1START

SystemInformationBlockType20-r13 ::=    SEQUENCE {
    sc-mcch-RepetionPeriod-r13          ENUMERATED {rf2, rf4, rf8, rf16, rf32, rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9)  OPTIONAL,
    sc-mcch-ModificationPeriod-r13      ENUMERATED {rf2, rf4, rf8, rf16, rf32, rf64, rf128, rf256,
                                         rf512, rf1024, rf2048, rf4096, rf8192, rf16384, rf32768,
                                         rf65536},
    lateNonCriticalExtension            OCTET STRING    OPTIONAL,
    ...
}

-- ASN1STOP
```

FIG. 10

SCPTMConfiguration message

```
-- ASN1START

SCPTMConfiguration-r13 ::=        SEQUENCE {
    sc-mtch-InfoList-r13           SC-MTCH-InfoList-r13,
    scptm-NeighbourCellList-r13    SCPTM-NeighbourCellList-r13    OPTIONAL,    -- Need OP
    lateNonCriticalExtension       OCTET STRING                   OPTIONAL,
    nonCriticalExtension           SEQUENCE {}                    OPTIONAL
}

-- ASN1STOP
```

SC-MTCH-InfoList information element

```
-- ASN1START

SC-MTCH-InfoList-r13 ::=          SEQUENCE (SIZE (0..maxSC-MTCH-r13)) OF SC-MTCH-Info-r13

SC-MTCH-Info-r13 ::=              SEQUENCE   {
    mbmsSessionInfo-r13               MBMSSessionInfo-r13,
    g-RNTI-r13                        BIT STRING(SIZE(16)),
    sc-mtch-schedulingInfo-r13        SC-MTCH-SchedulingInfo-r13         OPTIONAL,    --
Need OP
    sc-mtch-neighbourCell-r13         BIT STRING (SIZE(maxNeighCell-SCPTM-r13))
    OPTIONAL,    -- Need OP
    ...
}

MBMSSessionInfo-r13 ::=           SEQUENCE   {
    tmgi-r13                          TMGI-r9,
    sessionId-r13                     OCTET STRING (SIZE (1))    OPTIONAL    -- Need OR
}

SC-MTCH-SchedulingInfo-r13::=     SEQUENCE   {
    onDurationTimerSCPTM-r13          ENUMERATED {
                                          psf1, psf2, psf3, psf4, psf5, psf6,
                                          psf8, psf10, psf20, psf30, psf40,
                                          psf50, psf60, psf80, psf100,
                                          psf200},
    drx-InactivityTimerSCPTM-r13      ENUMERATED {
                                          psf0, psf1, psf2, psf4, psf8,
                                          psf10, psf20, psf40,
                                          psf80, psf160, ps320,
                                          psf640, psf960,
                                          psf1280, psf1920, psf2560},
    schedulingPeriodStartOffsetSCPTM-r13   CHOICE {
        sf10                              INTEGER(0..9),
        sf20                              INTEGER(0..19),
        sf32                              INTEGER(0..31),
        sf40                              INTEGER(0..39),
        sf64                              INTEGER(0..63),
        sf80                              INTEGER(0..79),
        sf128                             INTEGER(0..127),
        sf160                             INTEGER(0..159),
        sf256                             INTEGER(0..255),
        sf320                             INTEGER(0..319),
        sf512                             INTEGER(0..511),
        sf640                             INTEGER(0..639),
        sf1024                            INTEGER(0..1023),
        sf2048                            INTEGER(0..2048),
        sf4096                            INTEGER(0..4096),
        sf8192                            INTEGER(0..8192)
    },
    ...
}

-- ASN1STOP
```

```
-- ASN1START

SCPTM-NeighbourCellList-r13 ::=   SEQUENCE (SIZE (1..maxNeighCell-SCPTM-r13)) OF PCI-ARFCN-r13

PCI-ARFCN-r13 ::=                 SEQUENCE {
    physCellId-r13                    PhysCellId,
    carrierFreq-r13                   ARFCN-ValueEUTRA-r9    OPTIONAL
}

-- ASN1STOP
```

FIG. 16A

```
                SystemInformationBlockType1 message
SchedulingInfoList ::= SEQUENCE (SIZE (1..maxSI-Message)) OF SchedulingInfo SchedulingInfo ::=  SEQUENCE {
    si-Periodicity               ENUMERATED {
                                    rf8, rf16, rf32, rf64, rf128, rf256, rf512},
    sib-MappingInfo              SIB-MappingInfo
}
SIB-MappingInfo ::= SEQUENCE (SIZE (0..maxSIB-1)) OF SIB-Type SIB-Type ::=                     ENUMERATED {
                                    sibType3, sibType4, sibType5, sibType6,
                                    sibType7, sibType8, sibType9, sibType10,
                                    sibType11, sibType12-v920, sibType13-v920,
                                    sibType14-v1130, sibType15-v1130,
                                    sibType16-v1130, sibType17-v1250, sibType18-
v1250,
                                    ..., sibType19-v1250, sibType20-v1310,
                                    sibType20-master, sibType20-slave]
```

FIG. 16B

```
                SystemInformationBlockType1 message
SchedulingInfoList ::= SEQUENCE (SIZE (1..maxSI-Message)) OF SchedulingInfo SchedulingInfo ::=  SEQUENCE {
    si-Periodicity               ENUMERATED {
                                    rf8, rf16, rf32, rf64, rf128, rf256, rf512},
    sib-MappingInfo              SIB-MappingInfo
}
SIB-MappingInfo ::= SEQUENCE (SIZE (0..maxSIB-1)) OF SIB-Type SIB-Type ::=                     ENUMERATED {
                                    sibType3, sibType4, sibType5, sibType6,
                                    sibType7, sibType8, sibType9, sibType10,
                                    sibType11, sibType12-v920, sibType13-v920,
                                    sibType14-v1130, sibType15-v1130,
                                    sibType16-v1130, sibType17-v1250, sibType18-v1250,
                                    ..., sibType19-v1250, sibType20-v1310,
                                    sibType20-NC, sibType20-CE1, sibType20-CE2]
```

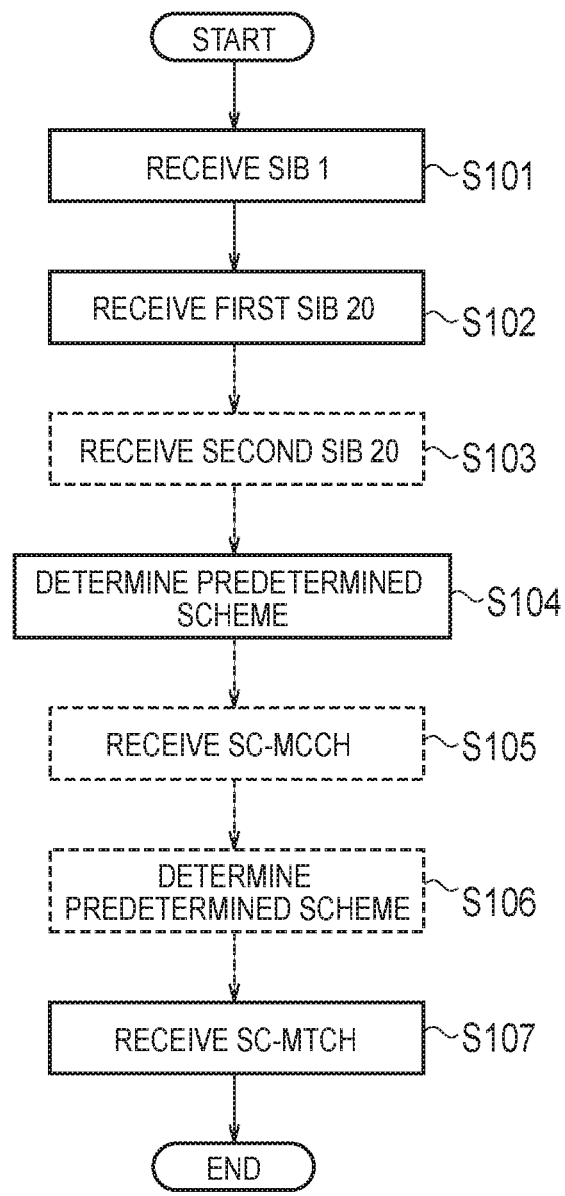

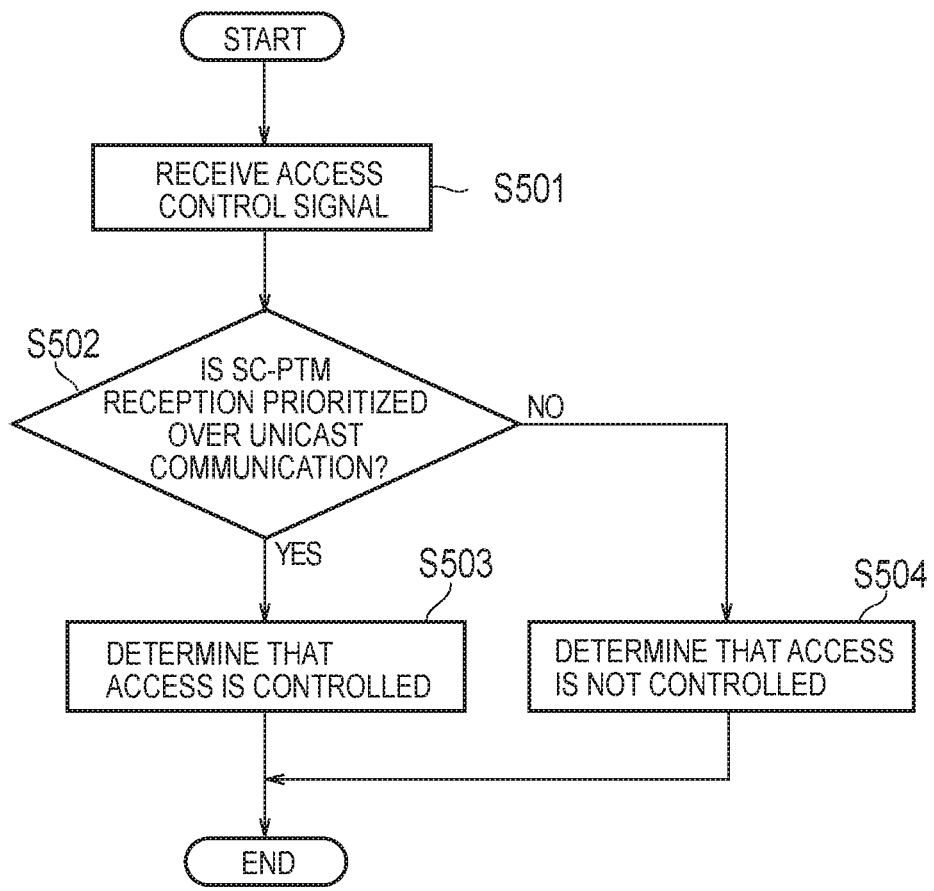

MOBILE COMMUNICATION SYSTEM

CROSS-REFERENCE TO RELATED APPLICATION

The present application is a continuation based on PCT Application No. PCT/JP2017/035175 filed on Sep. 28, 2017, which claims the benefit of U.S. Provisional Application No. 62/402,293 filed Sep. 30, 2016. The content of which are incorporated by reference herein in their entirety.

TECHNICAL FIELD

The present invention relates to a mobile communication system providing a multicast/broadcast service.

BACKGROUND ART

In 3GPP (Third Generation Partnership Project), which is a project aiming to standardize a mobile communication system, the specifications of MBMS (Multimedia Broadcast Multicast Service) have been laid out to provide a radio terminal with a multicast/broadcast service. Radio transmission schemes for MBMS include two schemes: MBSFN (Multicast Broadcast Single Frequency Network) transmission and SC-PTM (Single Cell Point-To-Multipoint) transmission.

Meanwhile, radio terminals for MTC (Machine Type Communication) and IoT (Internet of Things) services, which perform communication without human intervention, have been studied. Such a radio terminal is required to achieve low cost, wide coverage area, and low power consumption. For this reason, in 3GPP, a category for radio terminals having a transmission and reception bandwidth limited to just a part of the system bandwidth (system transmission and reception band) is specified. A coverage enhancement technique including repetition is applied to a radio terminal in such a new category.

SUMMARY OF THE INVENTION

A mobile communication system according to one embodiment comprises a first radio terminal configured to transmit and receive a radio signal by using a limited frequency band limited to a bandwidth of a predetermined number of resource blocks, a second radio terminal configured to transmit and receive a radio signal by using a frequency band wider than the limited frequency band, and a base station configured to transmit configuration information of SC-MTCH being a traffic channel for SC-PTM transmission by SC-MCCH being a control channel for the SC-PTM transmission. The base station sets a first period to the first radio terminal, and sets a second period to the second radio terminal as an SC-MCCH change period in which the configuration information of the SC-MTCH can be changed. The first period is longer than the second period.

A mobile communication system according to one embodiment comprises: a base station configured to distribute an MBMS service to a radio terminal by an SC-PTM transmission using a coverage enhancement technique including repetition, and a radio terminal configured to receive the MBMS service. The base station transmits a plurality of specific system information blocks for the SC-PTM transmission. The plurality of specific system information blocks include a first specific system information block, and a second specific system information block whose coverage extension level to be applied is different from that of the first specific system information block.

A mobile communication system according to one embodiment comprises: a base station configured to distribute an MBMS service by SC-PTM transmission, and a radio terminal configured to receive the MBMS service. The base station transmits a specific system information block for the SC-PTM transmission to the radio terminal. The radio terminal determines whether or not a predetermined scheme is used for the SC-PTM transmission based on the specific system information block. The predetermined scheme includes at least one of a first scheme in which semi-static scheduling that does not use PDCCH is applied to SC-MCCH and/or SC-MTCH, a second scheme in which the same cell uses a plurality of SC-MCCHs, and a third scheme in which scheduling of the SC-MTCH is performed by the specific system information block without using the SC-MCCH.

A mobile communication system according to one embodiment comprises: a radio terminal configured to transmit and receive a radio signal by using a limited frequency band limited to a bandwidth of a predetermined number of resource blocks. The radio terminal receives bandwidth information from a first cell. The bandwidth information is information about a frequency bandwidth used for SC-PTM transmission by a second cell different from the first cell.

A mobile communication system according to one embodiment comprises: a plurality of radio terminals having different upper limits of a bandwidth of a radio signal to be transmitted and received. A base station configured to transmit a plurality of control information items having different transmission schemes to the plurality of radio terminals, and transmit same data to the plurality of radio terminals. The base station includes scheduling information for scheduling the same PDSCH resource carrying the same data, into the plurality of the control information items.

A mobile communication system according to one embodiment comprises: a base station configured to start repetition of data after repetition of control information over a plurality of subframes, and a radio terminal configured to receive the control information, and receive the data based on the received control information. The base station notifies the radio terminal of information indicating the number of subframes from a first subframe in which the repetition of the control information is ended up to a second subframe in which the transmission of the data is started.

A mobile communication system according to one embodiment comprises: a radio terminal configured to transmit and receive a radio signal by using a limited frequency band limited to a bandwidth of a predetermined number of resource blocks. The radio terminal selects either a first reception operation of demodulating the radio signal using a first reference signal exclusive for the limited frequency band, or a second reception operation of demodulating the radio signal using a second reference signal not exclusive for the limited frequency band. The radio terminal, when performing SC-PTM reception, selects the second reception operation instead of the first reception operation.

A mobile communication system according to one embodiment comprises: a radio terminal configured to transmit and receive a radio signal by using a limited frequency band limited to a bandwidth of a predetermined number of resource blocks. If the radio terminal has capability to simultaneously perform a unicast reception and SC-PTM reception by using different limited frequency bands, the radio terminal transmits, to the base station, capability information indicating that the radio terminal has the capability.

A mobile communication system according to one embodiment comprises: a base station configured to transmit an access control signal for performing an access control either by broadcast or multicast, and a radio terminal configured to determine, based on the access control signal, whether or not an access to the base station is controlled. The access control signal includes first information for controlling access to the base station by a first radio terminal prioritizing MBMS reception over unicast communication, or second information for controlling access to the base station by a second radio terminal prioritizing the unicast communication over the MBMS reception.

BRIEF DESCRIPTION OF THE DRAWINGS

FIG. 8 is a flowchart illustrating an operation example of SC-PTM according to the embodiment.

FIG. 9 is a diagram illustrating a SIB 20 according to the embodiment.

FIG. 10 is a diagram illustrating SCPTM configuration information (SCPTM Configuration) in SC-MCCH according to the embodiment.

FIGS. 16A and 16B are diagrams illustrating an example of a SIB 1 according to the first embodiment.

FIG. 17 is a flowchart illustrating an operation example of a UE according to the first embodiment.

FIG. 24 is a flowchart illustrating an operation example of a UE according to a fifth embodiment.

DESCRIPTION OF THE EMBODIMENT (Mobile Communication System)

Figure 1:
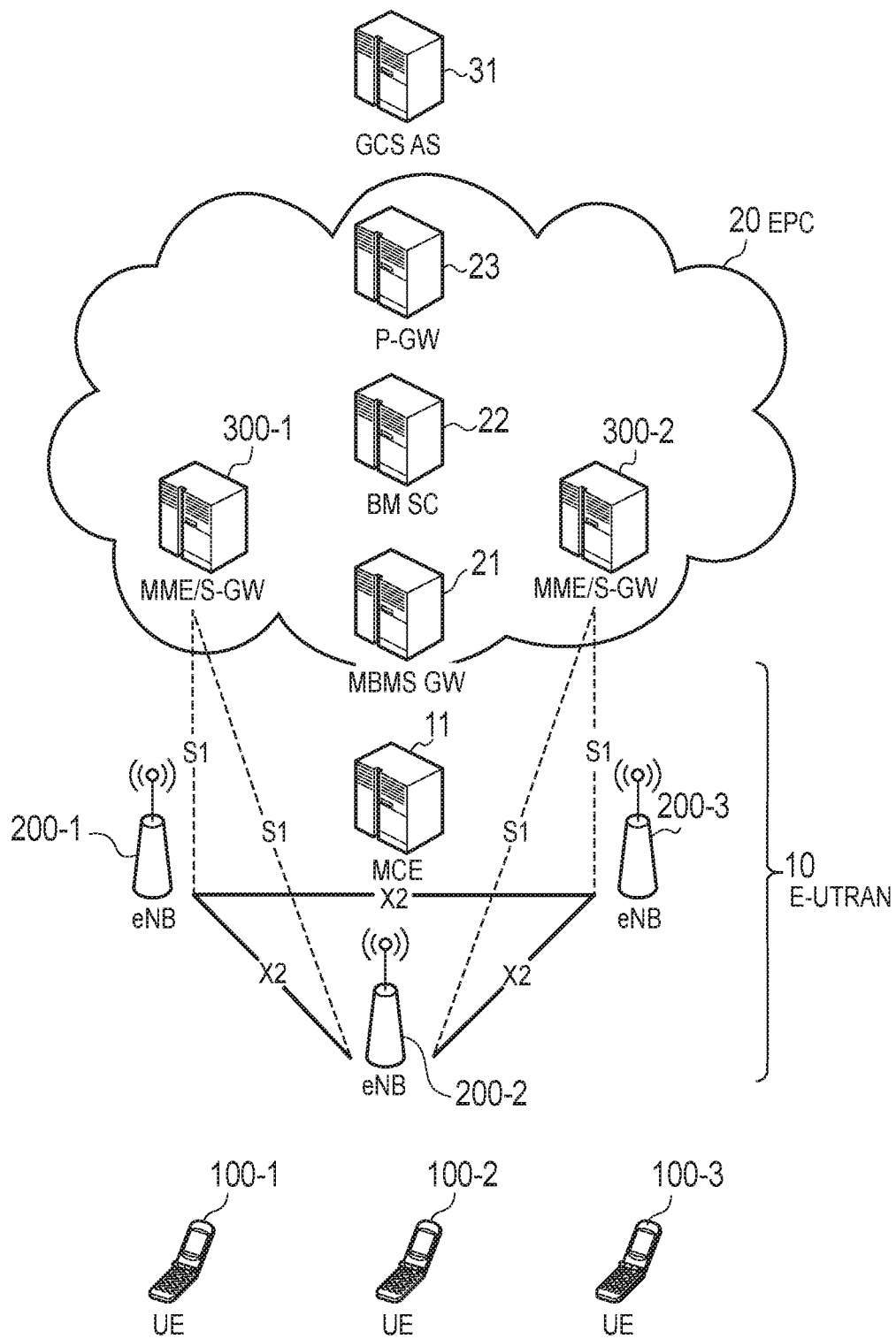
FIG. 1 is a diagram illustrating a configuration of an LTE system according to an embodiment.
Figure 2:
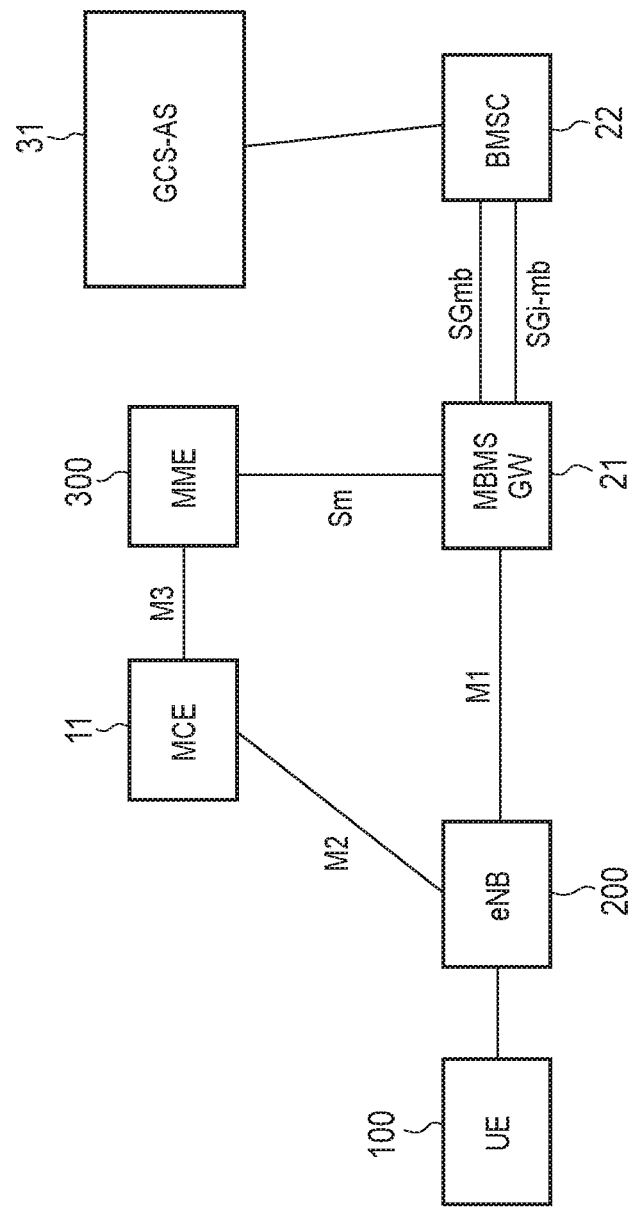
FIG. 2 is a diagram illustrating a network configuration for MBMS according to the embodiment.

The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM) function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-OW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface. The MCE is connected to the MME 300 via an M3 interface (see FIG. 2). The MCE 11 performs MBSFN radio resource management/allocation and the like. Specifically, the MCE 11 performs scheduling of MBSFN transmission. On the other hand, the scheduling of the SC-PTM transmission is performed by the eNB 200.

The EPC 20 includes an MBMS GW (MBMS Gateway) 21. The MBMS GW 21 is connected to the eNB 200 via an M1 interface. The MBMS GW 21 is connected to the MME 300 via an Sm interface. The MBMS GW 21 is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces. The BM-SC 22 is connected to the P-GW 23 via an SGi interface (see FIG. 2). The BM-SC 22 manages and allocates TMGI (Temporary Mobile Group Identity) and the like.

A GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB 2-C interface. The GCS AS 31 is connected to the P-GW 23 via the SGi interface. The GCS AS 31 performs management of groups and data distribution etc. in group communication.

Figure 3:
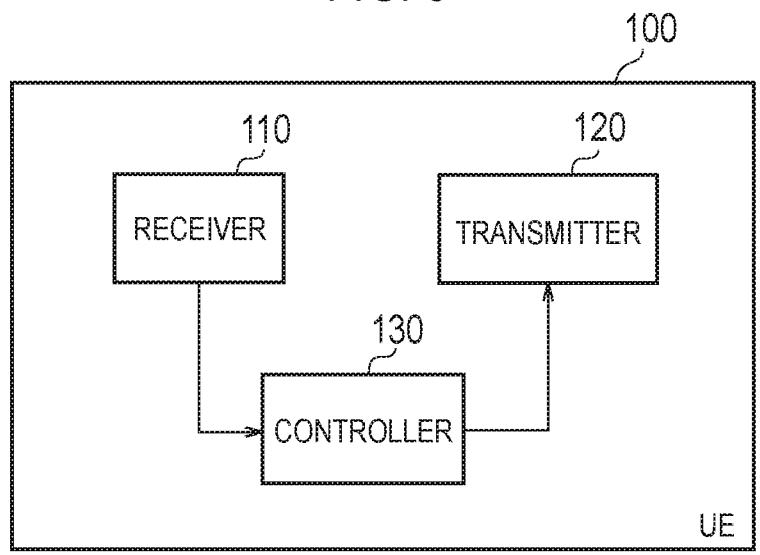
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal). The receiving machine outputs the baseband signal to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal. The transmitting machine transmits the radio signal from the antennas.

The controller 130 performs various controls in the UE 100. The controller 130 includes a processor and a memory. The memory stores programs executed by the processor and information used for processing by the processor. The processor includes a baseband processor that performs modulation and demodulation, encoding, decoding, and the like of the baseband signal and a CPU (Central Processing Unit) that performs various processes by executing programs stored in the memory. The processor may include a codec that performs encoding/decoding audio/video signals. The processor executes various processes to be described later.

Figure 4:
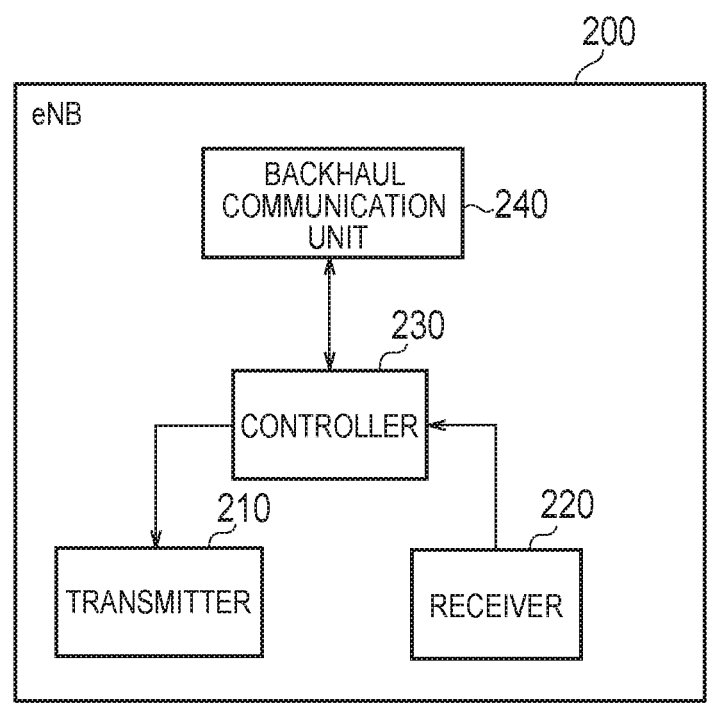
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal. The transmitting machine transmits the radio signal from the antennas.

The receiver 220 performs various types of reception under the control of the controller 230. The receiver 220 includes antennas and a receiving machine. The receiving machine converts the radio signal received by the antennas into a baseband signal (received signal). The receiving machine outputs the baseband signal to the controller 230.

The controller 230 performs various controls in the eNB 200. The controller 230 includes a processor and a memory. The memory stores programs executed by the processor and information used for processing by the processor. The processor includes a baseband processor that performs modulation and demodulation, encoding, decoding, and the like of the baseband signal and a CPU that performs various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like. The backhaul communication unit 240 can also be used for communication on the M1 interface and for communication on the M2 interface.

Figure 5:
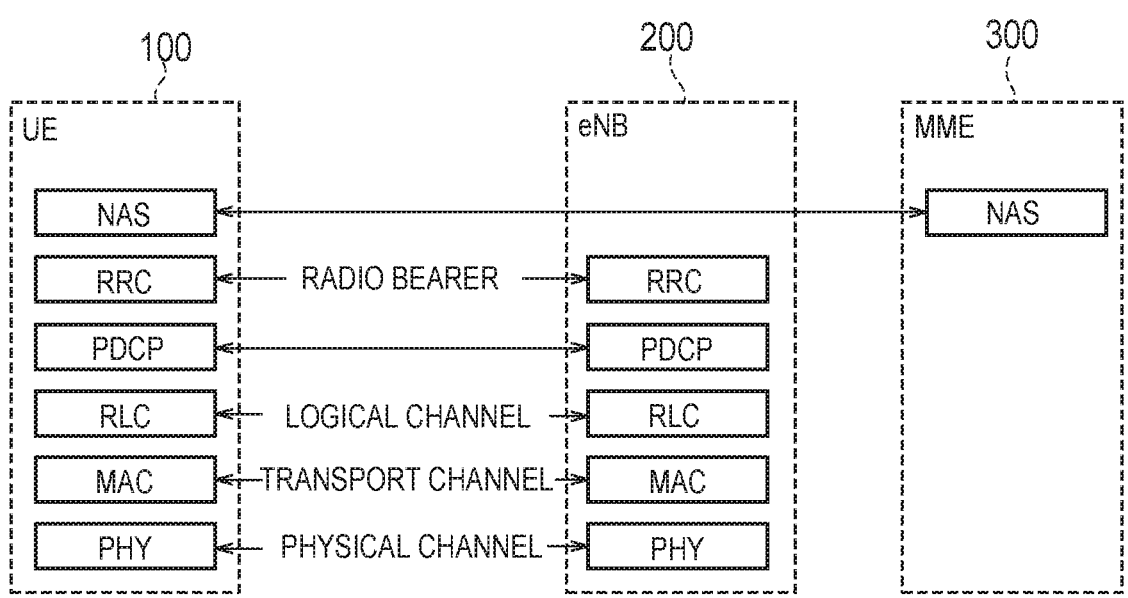
FIG. 5 is a diagram illustrating a protocol stack of a radio interface in the LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various configurations are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected state, otherwise the UE 100 is in the RRC idle state.

The NAS (Non-Access Stratum) layer located above the RRC layer performs session management, mobility management, and the like.

Figure 6A:
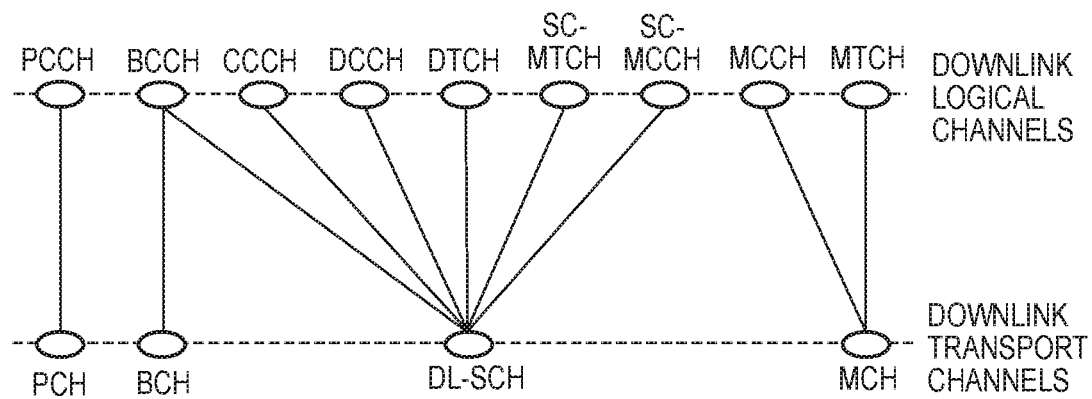
FIGS. 6A and 6B are diagrams illustrating a channel configuration of downlink of an LTE system according to the embodiment.

FIG. 6 is a diagram illustrating a channel configuration of downlink of the LTE system. FIG. 6(a) illustrates mapping between a logical channel (Downlink Logical Channel) and a transport channel (Downlink Transport Channel).

As illustrated in FIG. 6(a), PCCH (Paging Control Channel) is a logical channel for notifying paging information and system information change. The PCCH is mapped to PCH (Paging Channel) that is a transport channel.

BCCH (Broadcast Control Channel) is a logical channel for system information. The BCCH is mapped to BCH (Broadcast Control Channel) and a DL-SCH (Downlink Shared Channel), both of which are transport channels.

CCCH (Common Control Channel) is a logical channel for transmission control information between the UE 100 and the eNB 200. The CCCH is used if the UE 100 does not have an RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for data transmission. The DTCH is mapped to the DL-SCH.

SC-MTCH (Single Cell Multicast Traffic Channel) is a logical channel for SC-PTM transmission. The SC-MTCH is a point-to-multipoint downlink channel for transmitting data from the network to the UE 100 by using the SC-PTM transmission.

SC-MCCH (Single Cell Multicast Control Channel) is a logical channel for SC-PTM transmission. The SC-MCCH is a point-to-multipoint downlink channel for transmitting MBMS control information for one or more SC-MTCHs from the network to the UE 100. The SC-MCCH is used for a UE 100 that is to receive an MBMS using SC-PTM or that is interested in the reception. Further, there is only one SC-MCCH in one cell.

MCCH (Multicast Control Channel) is a logical channel for MBSFN transmission. The MCCH is used for transmitting MBMS control information for MTCH from the network to the UE 100. The MCCH is mapped to an MCH (Multicast Channel) that is a transport channel.

MTCH (Multicast Traffic Channel) is a logical channel for MBSFN transmission. The MTCH is mapped to the MCH.

Figure 6B:
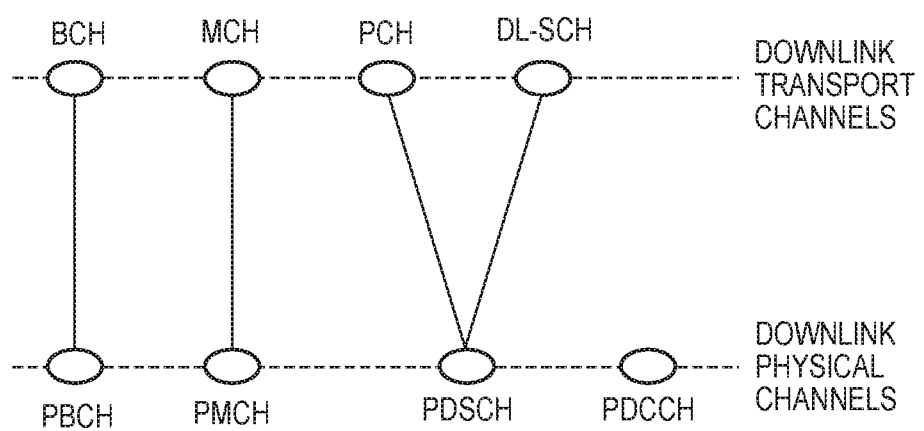

FIG. 6(b) illustrates mapping between a transport channel (Downlink Transport Channel) and a physical channel (Downlink Physical Channel).

As illustrated in FIG. 6(b), the BCH is mapped to PBCH (Physical Broadcast Channel).

The MCH is mapped to PMCH (Physical Multicast Channel). The MCH supports MBSFN transmission by a plurality of cells.

The PCH and the DL-SCH are mapped to PDSCH (Physical Downlink Shared Channel). The DL-SCH supports HARQ, link adaptation, and dynamic resource allocation.

PDCCH carries resource allocation information of the PDSCH (DL-SCH, PCH), HARQ information on the DL-SCH, and the like. Further, the PDCCH carries an uplink scheduling grant.

Figure 7:
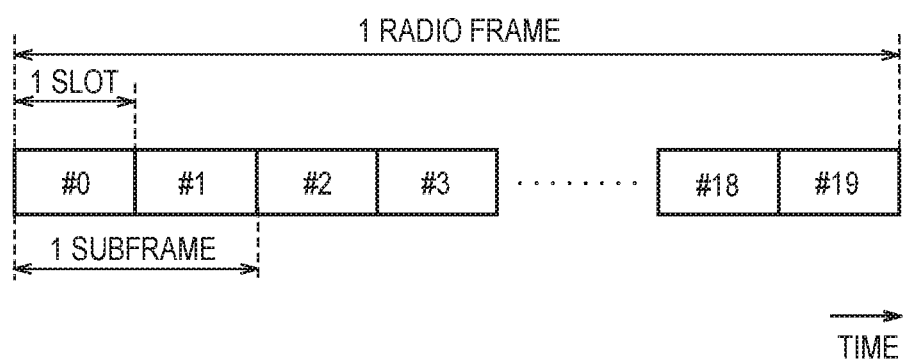
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 7, the radio frame includes ten subframes arranged in a time direction. Each of the subframes includes two slots arranged in the time direction. Each of the subframes has a length of 1 ms and each of the slots has a length of 0.5 ms. Each of the subframes includes a plurality of resource blocks (RBs) in a frequency direction, and a plurality of symbols in the time direction. Each of the resource blocks includes a plurality of subcarriers in the frequency direction. One resource element (RE) includes one symbol and one subcarrier. Further, of radio resources (time and frequency resources) to be allocated to a UE 100, the frequency resource can be identified by a resource block, and the time resource can be identified by a subframe (or a slot).

In the downlink, a section including several symbols at the head of each of the subframes is a region used as the PDCCH for mainly transmitting a downlink control signal. Furthermore, the remaining portion of each of the subframes is a region available as the PDSCH for mainly transmitting downlink data. Further, in the downlink, an MBSFN subframe that is a subframe for MBSFN transmission may be set.

In the uplink, both ends in the frequency direction of each subframe are regions used as the PUCCH for mainly transmitting a uplink control signal. The remaining portion of each subframe is a region available as the PUSCH for mainly transmitting uplink data.

(Outline of SC-PTM)

Radio transmission schemes for MBMS include two schemes: MBSFN transmission and SC-PTM transmission. In the MBSFN transmission, data is transmitted via the PMCH for each MBSFN area including a plurality of cells. In contrast, in the SC-PTM transmission, data is transmitted via the PDSCH for each cell. In the following, a scenario in which the UE 100 performs SC-PTM reception is mainly assumed. However, MBSFN may be assumed. The UE 100 may receive the MBMS service in the RRC connected state or may receive the MBMS service in the RRC idle state.

FIG. 8 is a diagram illustrating an operation example of SC-PTM.

As illustrated in FIG. 8, in step S11, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S12, the UE 100 receives an SIB (System Information Block) 20 from the eNB 200 via the BCCH. The SIB 20 includes information (scheduling information) necessary for acquiring the SC-MCCH. FIG. 9 is a diagram illustrating the SIB 20. As illustrated in FIG. 9, the SIB 20 includes sc-mcch-ModificationPeriod representing a cycle in which the content of the SC-MCCH can be changed, sc-mcch-RepetitionPeriod representing a transmission (retransmission) time interval of the SC-MCCH in the number of radio frames, sc-mcch-Offset representing a scheduled radio frame offset of the SC-MCCH, sc-mcch-Subframe representing a subframe in which the SC-MCCH is scheduled, and so forth. SC-MCCH (SCPTM Configuration) is sent every sc-mcch-RepetitionPeriod (every 2,560 ms maximum). The UE 100 acquires the SC-MCCH every sc-mcch-ModificationPeriod (maximum 655, 360 ms=about 10.92 minutes).

In step S13, the UE 100 receives SCPTM configuration information (SCPTM Configuration) from the eNB 200 via the SC-MCCH, based on the SIB 20. For the SC-MCCH transmission in the physical layer, an SC-RNTI (Single Cell RNTI) is used. FIG. 10 is a diagram illustrating the SCPTM configuration information (SCPTM Configuration) in the SC-MCCH. As illustrated in FIG. 10, the SCPTM configuration information includes control information applicable to the MBMS service, which is transmitted via SC-MRB (Single Cell MBMS Point to Multipoint Radio Bearer). The SCPTM configuration information includes sc-mtch-InfoList containing configuration for each SC-MTCH in the cell transmitting that information, and scptmNeighbourCellList being a list of neighbour cells providing the MBMS service via the SC-MRB. The sc-mtch-InfoList contains one or more pieces of SC-MTCH-Info. Each piece of the SC-MTCH-Info contains information on an ongoing MBMS session (mbmsSessionInfo) to be transmitted via the SC-MRB, a G-RNTI (Group RNTI) corresponding to the MBMS session, and sc-mtch-schedulingInfo being DRX information for the SC-MTCH. The mbmsSessionInfo contains a TMGI and a session ID (sessionId) to identify the MBMS service.

The G-RNTI is an RNTI to identify a multicast group (specifically, SC-MTCH addressed to a specific group). The G-RNTI is mapped to the TMGI on a one-to-one basis. The sc-mtch-schedulingInfo contains onDurationTimerSCPTM, drx-InactivityTimerSCPTM, and schedulingPeriodStartOffsetSCPTM. The schedulingPeriodStartOffsetSCPTM contains SC-MTCH-SchedulingCycle and SC-MTCH-SchedulingOffset. Here, the DRX for SC-PTM transmission will be described. DRX for SC-PTM transmission is an operation independent of DRX for unicast. The UE 100 in which the DRX for SC-PTM transmission is set intermittently monitors the PDCCH using the corresponding G-RNTI in the RRC connected mode or the RRC idle mode. If onDurationTimerSCPTM or drx-InactivityTimerSCPTM is running, it will be the active time. The UE 100 monitors the PDCCH at the active time. Also, the UE 100 starts the onDurationTimerSCPTM when "[(SFN*10)+subframe number] modulo (SC-MTCH-SchedulingCycle)=SC-MTCH-Scheduling Offset" is satisfied. If the PDCCH indicates a DL transmission, the UE 100 starts the drx-InactivityTimerSCPTM.

In step S14, the UE 100 receives the MBMS service (multicast data) corresponding to the TMGI, in which the UE 100 itself is interested, via the SC-MTCH, based on SC-MTCH-SchedulingInfo in the SCPTM configuration information (SCPTM Configuration). In the physical layer, the eNB 200, after transmitting the PDCCH by using the G-RNTI, transmits the multicast data via the PDSCH.

Figure 11:
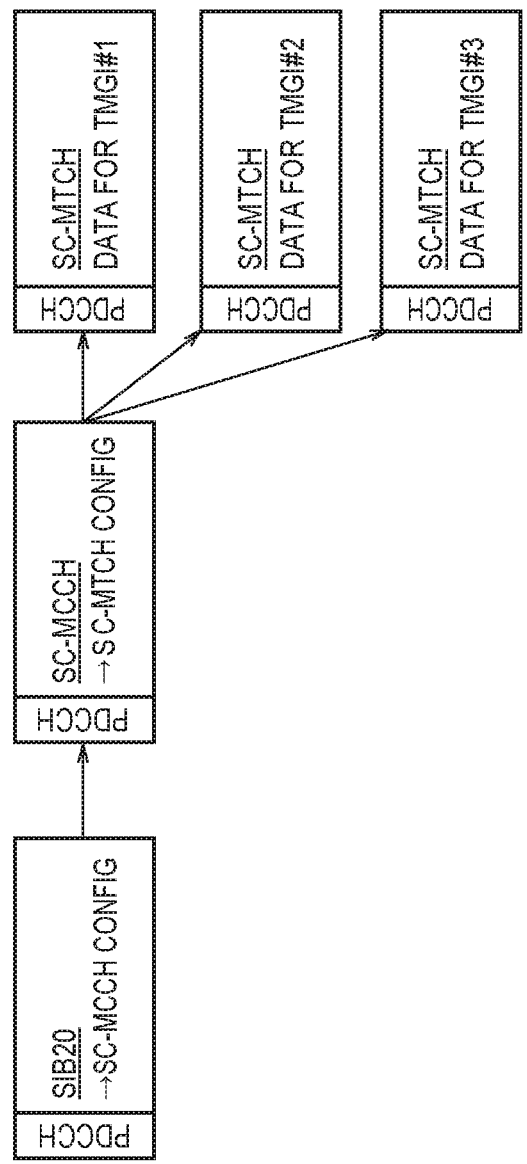
FIG. 11 is a diagram illustrating a SIB 20, SC-MCCH, and SC-MTCH according to the embodiment.

FIG. 11 is a diagram illustrating the SIB 20, the SC-MCCH, and the SC-MTCH.

As illustrated in FIG. 11, the SIB 20 includes information (SC-MCCH Config) necessary for acquiring the SC-MCCH. Only one SIB 20 exists in one cell. Although details will be described later, a plurality of SIBs 20 may exist in one cell.

The SC-MCCH includes information (SC-MTCH Config) necessary for acquiring the SC-MTCH. The information (SC-MTCH Config) corresponds to the SCPTM configuration information (SCPTM Configuration) illustrated in FIG. 10. Only one SC-MCCH exists in one cell. Although details will be described later, a plurality of SC-MCCHs may exist in one cell. Alternatively, the SC-MCCH may no longer be necessary and the SC-MTCH Config may be included in the SIB 20.

The SC-MTCH is provided for each MBMS service (TMGI). The SC-MTCH includes data (multicast data) belonging to the corresponding MBMS service.

The PDCCH is used to allocate the PDSCH in the physical layer for each of the SIB 20, the SC-MCCH, and the SC-MTCH. As will be described later in detail, by introducing semi-static scheduling in the SC-MCCH and/or the SC-MTCH, the PDCCH used for the SC-MCCH and/or the PDCCH used for the SC-MTCH may no longer be necessary.

(Outline of eMTC and NB-IoT)

In the embodiment, a scenario where a UE 100 in a new category exists is assumed. The UE 100 in the new category is a UE 100 whose transmission and reception bandwidth is limited only to a part of the system bandwidth (system transmission and reception band). The new UE category is referred to as, for example, category M1 and NB (Narrow Band)-IoT category. Here, the category M1 is an eMTC (enhanced Machine Type Communications) UE. The NB-IoT UE is category NB1. The category M1 limits the transmission and reception bandwidth of the UE 100 to 1.08 MHz (that is, the bandwidth of six resource blocks) and supports an enhanced coverage (CE) technique using repetition and the like. The NB-IoT category further limits the transmission and reception bandwidth of the UE 100 to 180 kHz (that is, the bandwidth of one resource block) and supports the coverage enhancement technique. Repetition is a technique of repeatedly transmitting the same signal using a plurality of subframes. As an example, the system bandwidth of the LTE system is 10 MHz, of which the transmission and reception bandwidth is 9 MHz (that is, the bandwidth of 50 resource blocks). On the other hand, the UE 100 in the M1 category cannot receive normal PDCCH because it cannot receive a downlink radio signal transmitted with a wider bandwidth than six resource blocks. For this reason, MPDCCH (MTC-PDCCH) being PDCCH for MTC is introduced. For the same reason, NPDCCH (NB-PDCCH) being PDCCH for NB-IoT is introduced.

It is noted that as for the eMTC UE, the limited frequency band limited to the bandwidth of six resource blocks is called a "narrowband (NB)". As for the NB-IoT UE, the limited frequency band limited to the bandwidth of one resource block is called a "carrier".

Figure 12:
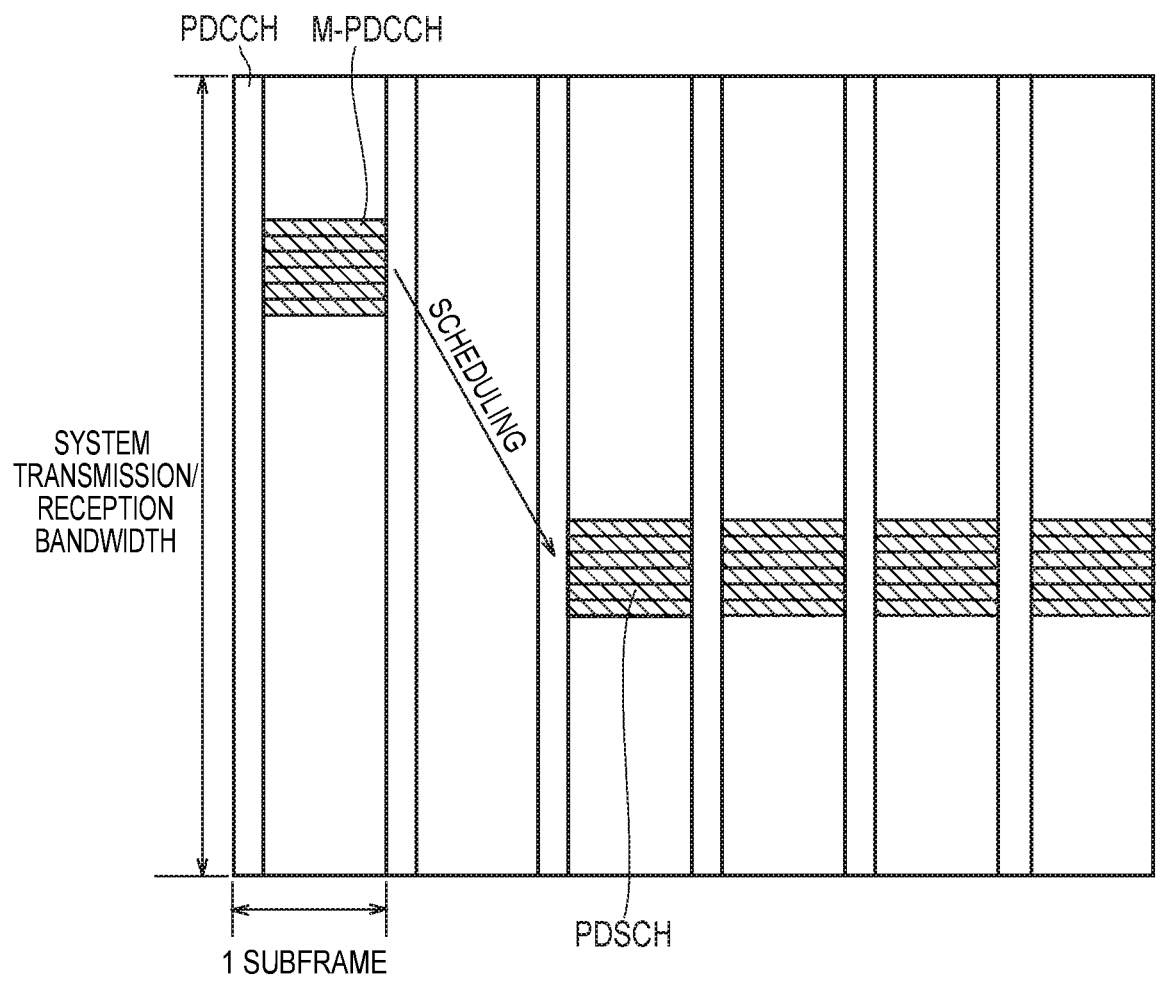
FIG. 12 is a diagram illustrating a downlink physical channel for an eMTC UE according to the embodiment.

FIG. 12 is a diagram illustrating a downlink physical channel for the eMTC UE. As illustrated in FIG. 12, the eNB 200 transmits MPDCCH within six resource blocks. The MPDCCH includes scheduling information for allocating PDSCH. As an example, the MPDCCH allocates PDSCH of a subframe different from the subframe in which the MPDCCH is transmitted. The eNB 200 transmits the PDSCH within six resource blocks. Further, the eNB 200 allocates PDSCHs to a plurality of subframes in order to perform repetition of the same signal. The UE 100 in category M1 identifies the allocated PDSCH by receiving the MPDCCH and receives data transmitted with the allocated PDSCH.

Figure 13:
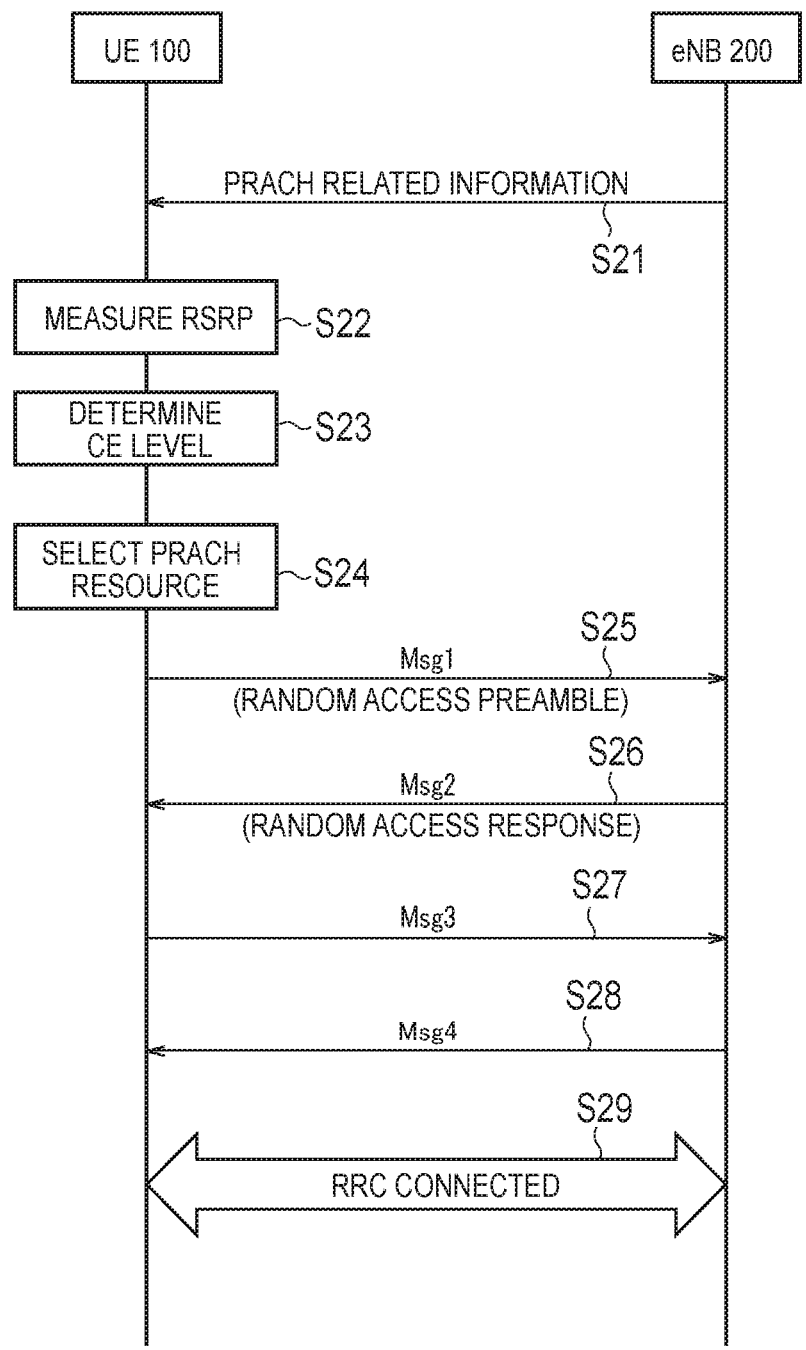
FIG. 13 is a flowchart illustrating a random access procedure for the eMTC UE and an NB-IoT UE according to the embodiment.

FIG. 13 is a flowchart illustrating a random access procedure for an eMTC UE and an NB-IoT UE. In an initial state of FIG. 13, the UE 100 is in the RRC idle state. The UE 100 performs a random access procedure for transiting to the RRC connected state.

The UE 100 selects a cell of the eNB 200 as a serving cell. The UE 100 may, if a first cell selection criteria for normal coverage is not satisfied, and a second cell selection criteria for enhanced coverage is satisfied, determine that the UE 100 is in an enhanced coverage. A "UE in an enhanced coverage" means a UE that is required to use the coverage enhancement technique (the enhanced coverage mode) to access a cell. It is noted that it is mandatory for the eMTC UE to use the enhanced coverage mode.

As illustrated in FIG. 13, in step S21, the eNB 200 transmits PRACH (Physical Random Access Channel) related information by broadcast signaling (for example, SIB). The PRACH related information includes various parameters provided for each enhanced coverage level (the CE level). The CE level may be referred to as the "enhanced coverage level". The various parameters include an RSRP (Reference Signal Received Power) threshold value, a PRACH resource, and the maximum preamble transmission number. The PRACH resource includes a radio resource (a time-frequency resource) and a signal sequence (a preamble sequence). The UE 100 stores the received PRACH related information.

In step S22, the UE 100 measures the RSRP based on a reference signal transmitted from the eNB 200.

In step S23, the UE 100 determines the CE level of the UE 100 by comparing the measured RSRP with the RSRP threshold value for each CE level. The CE level indicates the degree of enhanced coverage required for the UE 100. The CE level is related at least to the number of transmissions in repetition (that is, repetition count).

In step S24, the UE 100 selects a PRACH resource corresponding to the CE level of the UE 100.

In step S25, the UE 100 transmits an Msg 1 (random access preamble) to the eNB 200 using the selected PRACH resource. The eNB 200 identifies the CE level of the UE 100 based on the PRACH resource used for the received Msg 1.

In step S26, the eNB 200 transmits, to the UE 100, an Msg 2 (random access response) including scheduling information indicating the PUSCH resource allocated to the UE 100. It is noted that until the UE 100 properly receives the Msg 2, the UE 100 can transmit the Msg 1 a plurality of times up to the maximum preamble transmission number corresponding to the CE level of the UE 100.

In step S27, the UE 100 transmits an Msg 3 to the eNB 200 based on the scheduling information. The Msg 3 may be an RRC Connection Request message.

In step S28, the eNB 200 transmits an Msg 4 to the UE 100.

In step S29, the UE 100 transits to an RRC connected state in response to the reception of the Msg 4. Thereafter, the eNB 200 controls the repetition to the UE 100 based on the identified CE level.

First Embodiment

A first embodiment will be described below. In the first embodiment, a scenario is assumed in which multicast distribution of an MBMS service is performed by the SC-PTM transmission to a plurality of UEs 100 including a UE in a new category (eMTC UE and/or NB-IoT UE) described above.

The eNB 200 according to the first embodiment distributes the MBMS service to the UE 100 by the SC-PTM transmission using the coverage enhancement technique including repetition. The eNB 200 transmits a plurality of specific system information blocks for the SC-PTM transmission. Hereinafter, an example in which the specific system information block is the SIB 20 will be described, but the specific system information block may be a new SIB different from the SIB 20 (for example, an SIB 22).

In the first embodiment, the plurality of SIBs 20 include a first SIB 20, and a second SIB 20 having a different coverage extension level (CE level) from the first SIB 20. As a result, it is possible to appropriately transmit the SIB 20 to the UE 100 in the new category. The first SIB 20 includes information indicating the CE level applied to the second SIB 20 and/or an identifier (TMGI) of the MBMS service corresponding to the second SIB 20. As a result, the UE 100 can, based on the first SIB 20, determine whether or not the second SIB 20 is to be acquired. The first SIB 20 may include the scheduling information of the second SIB 20. It is noted that the CE level applied to the first SIB 20 may be fixed, or may be notified to the UE 100 by an SIB or the like other than the SIB 20.

In addition, the first SIB 20 may include information indicating the CE level applied to the SC-MCCH and/or an identifier (TMGI) of the MBMS service corresponding to the SC-MCCH.

The first CE level applied to the first SIB 20 may be higher than the second CE level applied to the second SIB 20. In other words, a greater repetition count than the second SIB 20 can be applied to the first SIB 20. As a result, the UE 100 can receive the first SIB 20 more reliably.

Figure 14:
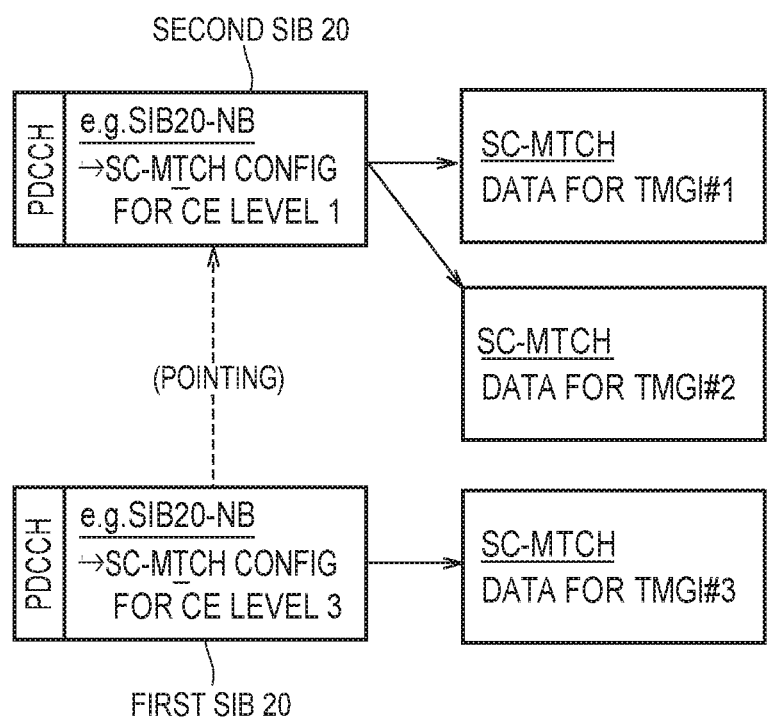
FIG. 14 is a diagram illustrating a first example of SC-PTM transmission according to the first embodiment.

FIG. 14 is a diagram illustrating a first example of the SC-PTM transmission according to a first embodiment.

As illustrated in FIG. 14, the eNB 200 transmits a plurality of SIBs 20. In the first example, a CE level 3 is applied to the first SIB 20 (the SIB 20-NB), and a CE level 1 is applied to the second SIB 20 (the SIB 20-NB). It is noted that "-NB" implies that the SIB 20 is for the NB-IoT. Here, an example in which there is only one second SIB 20 is shown, but a plurality of second SIBs 20 with different CE levels being applied may exist. Further, an example in which the first SIB 20 and the second SIB 20 are the SIBs 20 for the NB-IoT UE has been shown, but the first SIB 20 and the second SIB 20 may be the SIBs 20 for the eMTC UE.

The first SIB 20 includes information for pointing the second SIB 20. The pointing information includes at least one of the information indicating the CE level applied to the second SIB 20, the identifier (TMGI) of the MBMS service corresponding to the second SIB 20, and the scheduling information of the second SIB 20. The scheduling information of the second SIB 20 may include a periodicity and/or a duration of the second SIB 20. Further, the scheduling information of the second SIB 20 may include at least one of a start subframe, an offset, a modification period, a maximum retransmission count, and a frequency hopping configuration of the second SIB 20.

In addition, in the first example, the scheduling information of the SC-MTCH (SC-MTCH Config) is included into the SIB 20 so that the SC-MCCH is no longer necessary. The first SIB 20 includes information (SC-MTCH Config) necessary for acquiring the SC-MTCH corresponding to the TMGI #3. In addition, the second SIB 20 includes information (SC-MTCH Config) necessary for acquiring the SC-MTCH corresponding to the TMGI #1 and the SC-MTCH corresponding to the TMGI #2.

Figure 15:
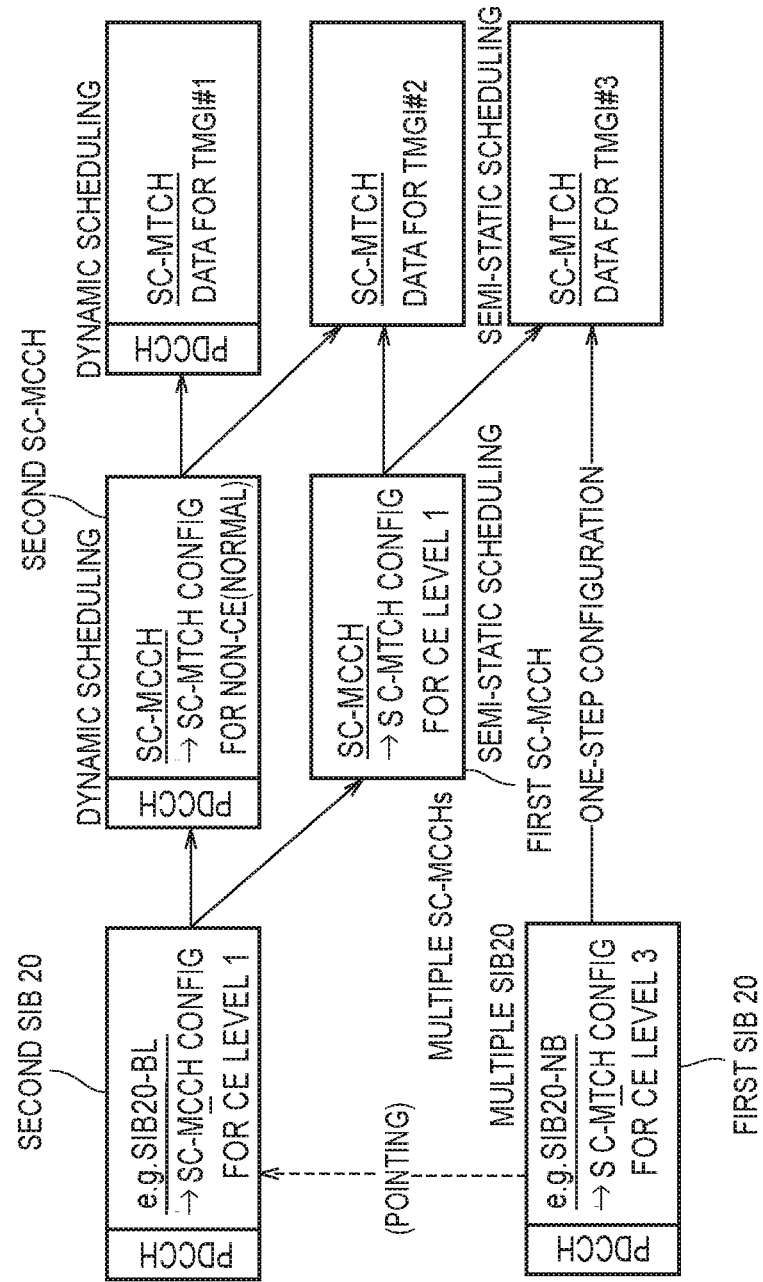
FIG. 15 is a diagram illustrating a second example of SC-PTM transmission according to the first embodiment.

FIG. 15 is a diagram illustrating a second example of the SC-PTM transmission according to the first embodiment.

As illustrated in FIG. 15, the eNB 200 transmits a plurality of SIBs 20. In the second example, the CE level 3 is applied to the first SIB 20 (the SIB 20-NB), and the CE level 1 is applied to the second SIB 20 (the SIB 20-BL). It is noted that "-BL" implies that the SIB 20 is for the eMTC. Here, an example in which the first SIB 20 is for the NB-IoT UE, and the second SIB 20 is for the eMTC UE has been shown. The first SIB 20 is transmitted in one carrier (one resource block) and the second SIB 20 is transmitted in one NB (six resource blocks). Therefore, the eMTC UE can receive the first SIB 20. Also, similar to the first example, the first SIB 20 includes pointing information for pointing the second SIB 20.

In the second example, the scheduling information of the SC-MTCH corresponding to the TMGI #3 (SC-MTCH Config) is included into the SIB 20 so that the SC-MCCH corresponding to the first SIB 20 is no longer necessary. In other words, the configuration of the SC-MTCH corresponding to the TMGI #3 is performed in one step by the first SIB 20 (One-step configuration).

In the second example, the second SIB 20 includes the scheduling information of each of a plurality of SC-MCCHs. The plurality of SC-MCCHs include a first SC-MCCH in which the CE level 1 is applied, and a second SC-MCCH in which the coverage enhancement technique is not applied. Semi-static scheduling that does not use the PDCCH is applied to the first SC-MCCH. Dynamic scheduling that uses the PDCCH is applied to the second SC-MCCH.

The first SC-MCCH includes information (SC-MTCH Config) necessary for acquiring SC-MTCH corresponding to the TMGI #3 and the SC-MTCH corresponding to the TMGI #2. In addition, the second SC-MCCH includes information (SC-MTCH Config) necessary for acquiring SC-MTCH corresponding to the TMGI #2 and the SC-MTCH corresponding to the TMGI #1. Here, the SC-MTCH corresponding to the TMGI #3 is scheduled on both the first SIB 20 (the CE level 3) and the first SC-MCCH (the CE level 1). In such a case, in order to match with the first SIB 20 having a high CE level, the CE level 3 may be applied to the SC-MTCH corresponding to the TMGI #3. For the same reason, the CE level 1 may be applied to the SC-MTCH corresponding to the TMGI #2.

It is noted that the first SIB 20 may be referred to as master SIB 20 (sibType 20-master). The second SIB 20 may be referred to as slave SIB 20 (sibType 20-slave).

In the first embodiment, the CE level applied to each of the plurality of SIBs 20 may be fixed. For example, an SIB 20 (SIB 20-NC) for normal coverage to which the coverage enhancement technique is not applied, an SIB 20 (SIB 20-CE1) to which the CE level 1 is applied, an SIB 20 (SIB 20-CE2) to which the CE level 2 is applied, and . . . may exist.

In the first embodiment, the plurality of SIBs 20 may be scheduled by a system information block type 1 (SIB 1). FIG. 16 is a diagram illustrating an example of the SIB 1 according to the first embodiment.

As illustrated in FIG. 16(*a*), the SIB 1 includes scheduling information (Scheduling info) of each SIB other than the SIB 1. The scheduling information of the SIB includes a period (si-Periodicity) and mapping information (sib-MappingInfo). The mapping information (sib-MappingInfo) includes the SIB type (SIB-Type). In the example illustrated in FIG. 16(*a*), the SIB type (SIB-Type) in the mapping information (sib-MappingInfo) includes the master SIB 20 (the sibType 20-master) and the slave SIB 20 (the sibType 20-slave). Alternatively, as illustrated in FIG. 16(*b*), the SIB type (SIB-Type) in the mapping information (sib-MappingInfo) may include the SIB 20 (SIB 20-NC) to which the coverage enhancement technique is not applied, the SIB 20 (SIB 20-CE1) to which the CE level 1 is applied, and the SIB 20 (SIB 20-CE2) to which the CE level 2 is applied. Likewise, the SIB 20-CE3 may be included. This information may be notified (broadcasted) by any of the SIBs 20 described above.

Next, an operation of the UE 100 according to the first embodiment will be described.

The UE 100 according to the first embodiment receives the MBMS service distributed from the eNB 200 by the SC-PTM transmission. The UE 100 receives the SIB 20 for the SC-PTM transmission (the specific system information block) from the eNB 200. The UE 100, based on the SIB 20, determines whether or not a predetermined scheme is used for the SC-PTM transmission. The predetermined scheme includes at least one of a first scheme in which semi-static scheduling that does not use the PDCCH is applied to the SC-MCCH and/or the SC-MTCH, a second scheme in which the same cell uses a plurality of SC-MCCHs, and a third scheme in which scheduling of the SC-MTCH is performed by the SIB 20 without using the SC-MCCH. If the UE 100 receives the SC-MCCH from the eNB 200, the UE 100 may, based on the SC-MCCH, determine whether or not the first scheme and/or the second scheme is used for the SC-PTM transmission.

FIG. 17 is a flowchart illustrating an operation example of the UE 100 according to the first embodiment.

As illustrated in FIG. 17, in step S101, the UE 100 receives the SIB 1 from the eNB 200. The UE 100 grasps the scheduling of the plurality of SIBs 20 based on the SIB 1.

In step S102, the UE 100 receives the first SIB 20 from the eNB 200. The UE 100 grasps the detailed information of the second SIB 20 (including, for example, the TMGI, and the CE level) based on the first SIB 20. The UE 100 may identify the second SIB 20 corresponding to the MBMS service (the TMGI) in which the UE 100 has an interest, and may receive the identified second SIB 20 (step S103). In this case, the UE 100 may identify the CE level applied to the second SIB 20, and may receive the second SIB 20 in the identified CE level.

In step S104, the UE 100, based on the first SIB 20 (and the second SIB 20), determines whether or not the predetermined scheme is used for the SC-PTM transmission. The UE 100, upon determining that the predetermined scheme is used, performs reception according to the predetermined scheme.

If the configurations for the reception of the SC-MCCH are not notified in the received SIB 20, the UE 100 may determine that the third scheme for scheduling the SC-MTCH by the SIB 20 without using the SC-MCCH is used for the SC-PTM transmission.

If a plurality of configurations (including, for example, occasion, repetition, NB/carrier number, and TMGI) for the reception of the SC-MCCH are notified in the received SIB 20, the UE 100 may determine that the second scheme in which the same cell uses a plurality of SC-MCCHs is used for the SC-PTM transmission.

If the configurations (including, for example, scheduling info and repetition) for the reception of the SC-MCCH are notified in the received SIB 20, the UE 100 may determine that the third scheme for scheduling the SC-MTCH by the SIB 20 without using the SC-MCCH is used for the SC-PTM transmission.

If designation information designating at least one of the first scheme to the third scheme is notified in the received SIB 20, the UE 100 may determine that the specified scheme is used for the SC-PTM transmission. The designation information may include information indicating that the PDCCH (the MPDCCH or the NPDCCH) may not be received, or information indicating that the PDCCH (the MPDCCH or the NPDCCH) is to be received.

Alternatively, if the UE 100 receives a new SIB different from the SIB 20 (for example, the SIB 22), the UE 100 may determine that among the first scheme to the third scheme, the predetermined scheme is used for the SC-PTM transmission.

If the third scheme is not used, then in step S105, the UE 100 may receive the SC-MCCH based on the received SIB 20. In this case, in step S106, the UE 100 may, based on the received SC-MCCH, determine whether or not the first scheme and/or the second scheme is used for the SC-PTM transmission. As an example, if designation information designating at least one of the first scheme and the second scheme is notified in the received SC-MCCH, the UE 100 may determine that the specified scheme is used for the SC-PTM transmission. The designation information may include information indicating that the PDCCH (the MPDCCH or the NPDCCH) may not be received, or information indicating that the PDCCH (the MPDCCH or the NPDCCH) is to be received. It is noted that if the CE level information (including repetition) is included as a configuration for the reception of the SC-MTCH in the received SC-MCCH, the UE 100 may receive the SC-MTCH based on the CE level information.

In step S107, the UE 100 receives the SC-MTCH based on the SIB 20 and/or the SC-MCCH.

Second Embodiment

A second embodiment will be described while focusing on differences from the first embodiment, below. In the second embodiment, a scenario is assumed in which a UE in a new category (an eMTC UE and/or an NB-IoT UE) either receiving or having an interest in receiving the MBMS service distributed by the SC-PTM transmission moves from one cell to another cell.

The UE 100 according to the second embodiment transmits and receives a radio signal by using a limited frequency band limited to the bandwidth of a predetermined number of resource blocks. If the UE 100 is an eMTC UE, the limited frequency band is a "narrow band (NB)" limited to the bandwidth of six resource blocks. If the UE 100 is an NB-IoT UE, the limited frequency band is a "carrier" limited to the bandwidth of one resource block. In the second embodiment, the UE 100 receives, from the first cell (the serving cell), bandwidth information about a frequency bandwidth used for the SC-PTM transmission by a second cell (neighbour cell) different from the first cell. As a result, the UE 100 can obtain information about the frequency bandwidth used by the neighbour cell for the SC-PTM transmission while maintaining the first cell as the serving cell.

In the second embodiment, the bandwidth information may include basic information indicating whether or not the neighbour cell is performing SC-PTM transmission in the limited frequency band. The basic information may be a flag (for example, an ENUM (NB, Carrier, . . . )) indicating whether or not the SC-PTM transmission is performed in a narrow band (NB) limited to the bandwidth of six resource blocks, and/or whether or not the SC-PTM transmission is performed in a carrier limited to the bandwidth of one resource block. Alternatively, the basic information may be information indicating the (maximum) number of resource blocks used for the SC-PTM transmission. The UE 100 may, based on the basic information, determine whether or not the SC-PTM reception is possible in the neighbour cell. As a result, the UE 100 can determine whether or not the SC-PTM reception is possible in the neighbour cell, before moving to the neighbour cell. If the SC-PTM reception is not possible in the neighbour cell, the UE 100 receiving the SC-PTM can, when moving to the neighbour cell, perform an operation for continuing the reception of the corresponding MBMS service (for example, notification to the eNB 200 or transition to the RRC connected state).

In the second embodiment, the bandwidth information may include detailed information indicating a limited frequency band used by the neighbour cell for the SC-PTM transmission. The detailed information may be a narrow band (NB) number or a carrier number, a resource block number, or a bitmap of a resource block. If frequency hopping in the limited frequency band is used, the detailed information may include an initial position of the limited frequency band and the hopping pattern information. The hopping pattern information includes at least one of the parameters related to frequency hopping, for example, a hopping number, a hopping width, and a hopping cycle. The UE 100 may, based on the detailed information, perform the SC-PTM reception from the neighbour cell in the limited frequency band. As a result, the UE 100 can perform efficient SC-PTM reception by identifying the limited frequency band used by the neighbour cell for the SC-PTM transmission without searching the entire bandwidth of the neighbour cell. As an example, the UE 100 can obtain information about the MBMS service distributed in the neighbour cell by receiving the SIB 20 and/or the SC-MCCH transmitted by the neighbour cell in the limited frequency band. As another example, the UE 100 can, when moving from the serving cell to the neighbour cell, immediately receive the SIB 20 and/or the SC-MCCH from the neighboring cell.

Figure 18:
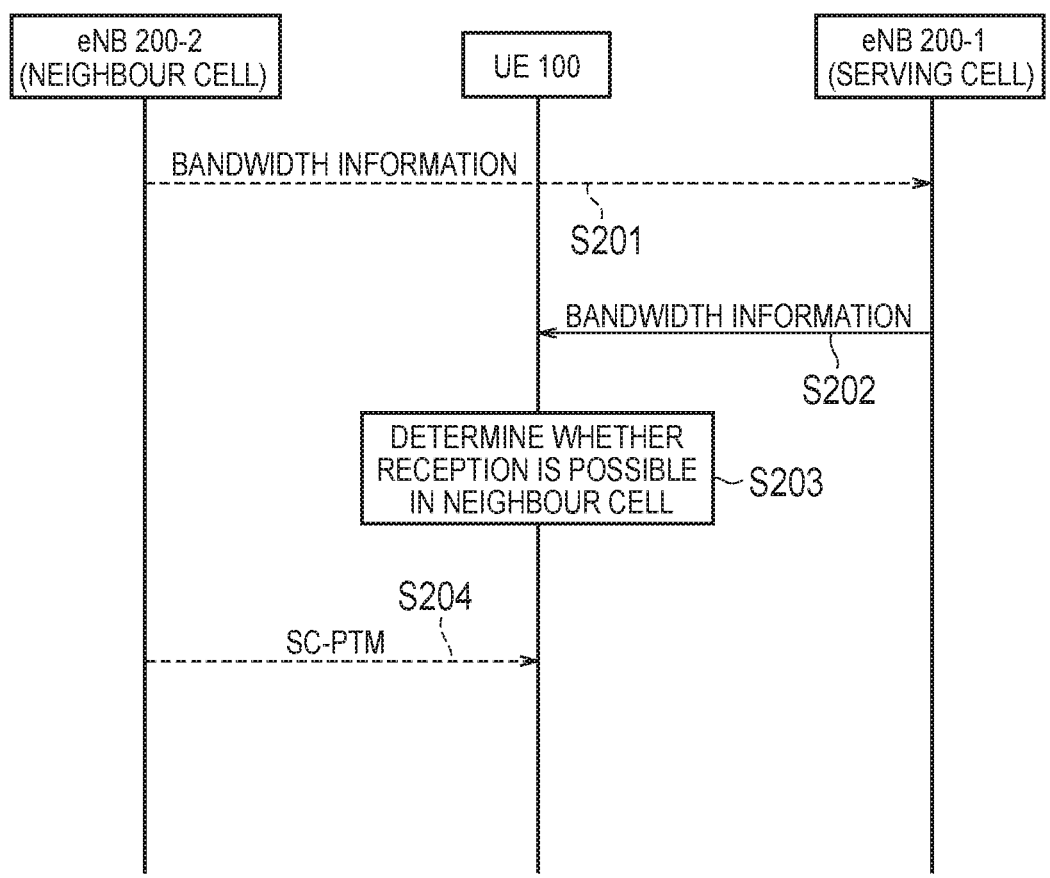
FIG. 18 is a flowchart illustrating an operation example according to a second embodiment.

FIG. 18 is a flowchart illustrating an operation example according to the second embodiment. In FIG. 18, an example in which the serving cell and the neighbour cell are managed by different eNBs 200 is illustrated, but the serving cell and the neighbour cell may be managed by the same eNB 200.

As illustrated in FIG. 18, in step S201, an eNB 200-1 (the serving cell) may acquire the bandwidth information from an eNB 200-2 (neighbour cell) on an X2 interface, for example. The bandwidth information is information about the frequency bandwidth currently used by the eNB 200-2 for the SC-PTM transmission. Alternatively, the eNB 200-1 may acquire the bandwidth information from the MCE 11.

In step S202, the eNB 200-1 transmits the bandwidth information to the UE 100 either by broadcast or multicast. The eNB 200-1 may transmit the bandwidth information via the SC-MCCH. In this case, the bandwidth information may be included in the scptmNeighbourCellList (see FIG. 10) in the SC-MCCH.

The bandwidth information includes basic information indicating whether or not the neighbour cell is performing the SC-PTM transmission in the limited frequency band, and/or detailed information indicating the limited frequency band used by the neighbour cell for the SC-PTM transmission. The detailed information may also serve as the basic information. That is, the UE 100 that has received the detailed information may determine that the neighbour cell is performing the SC-PTM transmission in the limited frequency band.

The bandwidth information may include at least one of the following information as information associated with the basic information and/or the detailed information.

TMGI of the MBMS service distributed by the neighbour cell.

Cell ID of the neighbour cell

Frequency to which the neighbour cell belongs

Initial position of the limited frequency band and hopping pattern information. The bandwidth information may further include subframe information for identifying the hopping position of the current limited frequency band (that is, the information indicating the number of the current subframe). The bandwidth information may further include start position information indicating a subframe of the first-time transmission so that the reception can be started from the middle of the repetition in the neighbour cell.

Distribution start time of the MBMS service in the neighbour cell. As an example, if the MBMS service is firmware distribution, then the distribution start time is the distribution start time of the firmware.

In step S203, the UE 100, based on the bandwidth information received from the eNB 200-1, determines whether or not the SC-PTM reception is possible in the neighbour cell. If it is determined that the SC-PTM reception is possible in the neighbour cell, the UE 100 may perform the SC-PTM reception from the neighbour cell based on the bandwidth information (step S204).

Third Embodiment

A third embodiment will be described while focusing on differences from the first and second embodiments below. In the third embodiment, a scenario is assumed in which UEs in various categories including new categories coexist.

The eNB 200 according to the third embodiment distributes the MBMS service to a plurality of UEs 100 by the SC-PTM transmission. In the plurality of UEs 100, the upper limit of the bandwidth of a radio signal to be transmitted and received is different. As an example, the plurality of UEs 100 include an eMTC UE, an NB-IoT UE, and a general UE. A general UE is a UE that is not restricted to use the limited frequency band, and can transmit and receive radio signals by using the system bandwidth as a whole. The general UE may be a UE to which the coverage enhancement technique is not applied.

The eNB 200 transmits, to the plurality of UEs 100, a plurality of control information items to be transmitted by different transmission methods, and transmits the same data to the plurality of UEs 100. The eNB 200 includes the scheduling information for scheduling the same PDSCH resource carrying the same data into the plurality of control information items. As a result, even when UEs in various categories including new categories coexist, it is possible to perform the MBMS distribution using the same PDSCH resource. The scheduling information may include a DRX parameter. The eNB 200 may include the same DRX parameter into the different control information.

Figure 19:
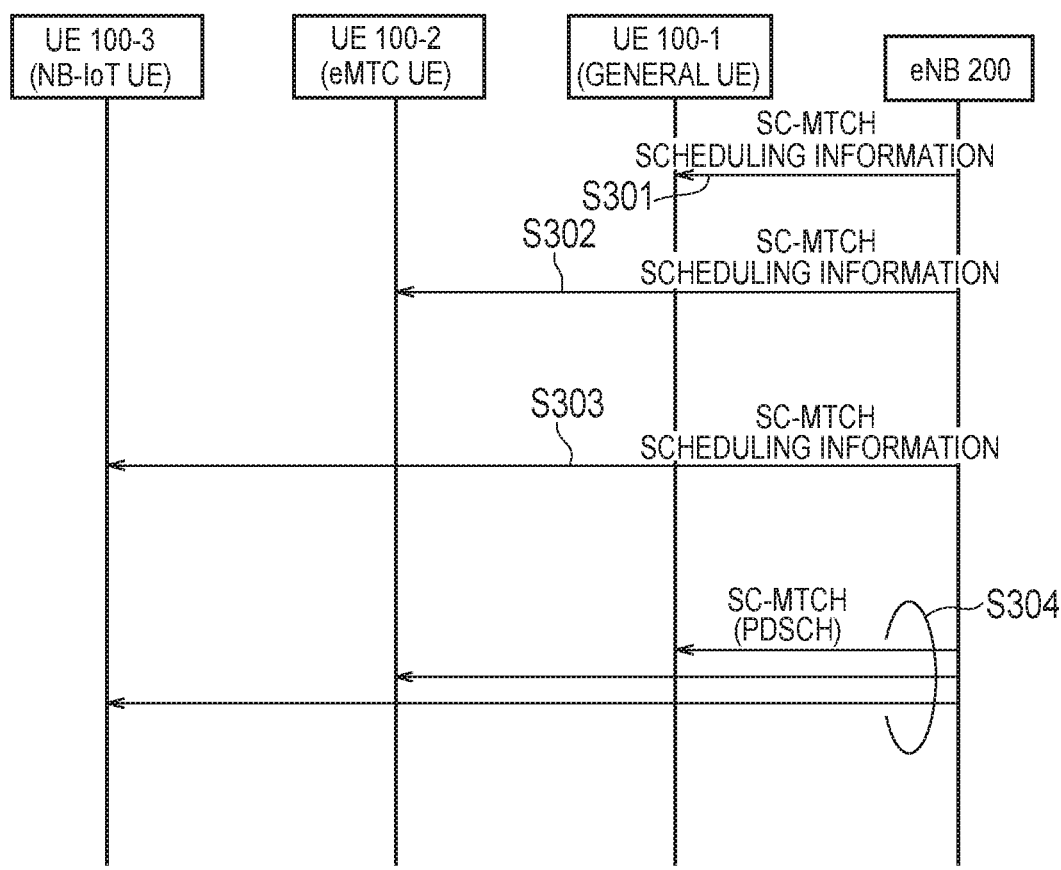
FIG. 19 is a flowchart illustrating an operation example of SC-MTCH scheduling according to a third embodiment.

FIG. 19 is a flowchart illustrating an operation example of SC-MTCH scheduling according to the third embodiment. In FIG. 19, a UE 100-1 belongs to the category of general UEs, a UE 100-2 belongs to the category of eMTC UEs, and a UE 100-3 belongs to the category of NB-IoT UEs.

As illustrated in FIG. 19, in step S301 through step S303, the eNB 200 transmits the SC-MTCH scheduling information to the UE 100-1 through the UE 100-3 by different transmission methods. As an example, the SC-MTCH scheduling information is sc-mtch-schedulingInfo (see FIG. 10) including a DRX parameter for the SC-MTCH. The SC-MTCH scheduling information may be transmitted by the SC-MTCH or may be transmitted by the SIB 20 (see the first embodiment). Note that the order of the steps S301 to S303 is not limited to this order.

The SC-MTCH scheduling information transmitted to the general UE in step S301 may not be transmitted in the limited frequency band. Also, repetition may not be applied to the SC-MTCH scheduling information.

The SC-MTCH scheduling information transmitted to the eMTC UE in step S302 is transmitted in a narrow band (NB) limited to the bandwidth of six resource blocks. Also, repetition is applied to the SC-MTCH scheduling information.

The SC-MTCH scheduling information transmitted for the NB-IoT UE in step S303 is transmitted in a carrier limited to the bandwidth of one resource block. Also, repetition is applied to the SC-MTCH scheduling information.

Here, the plurality of SC-MTCH scheduling information (steps S301 through S303) is set so as to schedule the same PDSCH resource in the UE 100-1 to the UE 100-3. Specifically, as for the plurality of SC-MTCH scheduling information, at least one DRX parameter is set to the same value so that the UE 100-1 to the UE 100-3 have an On duration in the same subframe number of the same system frame number (SFN). Even if the On duration is set for only a predetermined hyper system frame number (H-SFN) by the eDRX (extended DRX), the PD-SCH is scheduled at the same timing in the SFN and subframe units.

In step S304, the eNB 200 transmits the PDSCH (data) corresponding to the SC-MTCH in the subframe scheduled by the SC-MTCH scheduling information.

Figure 20:
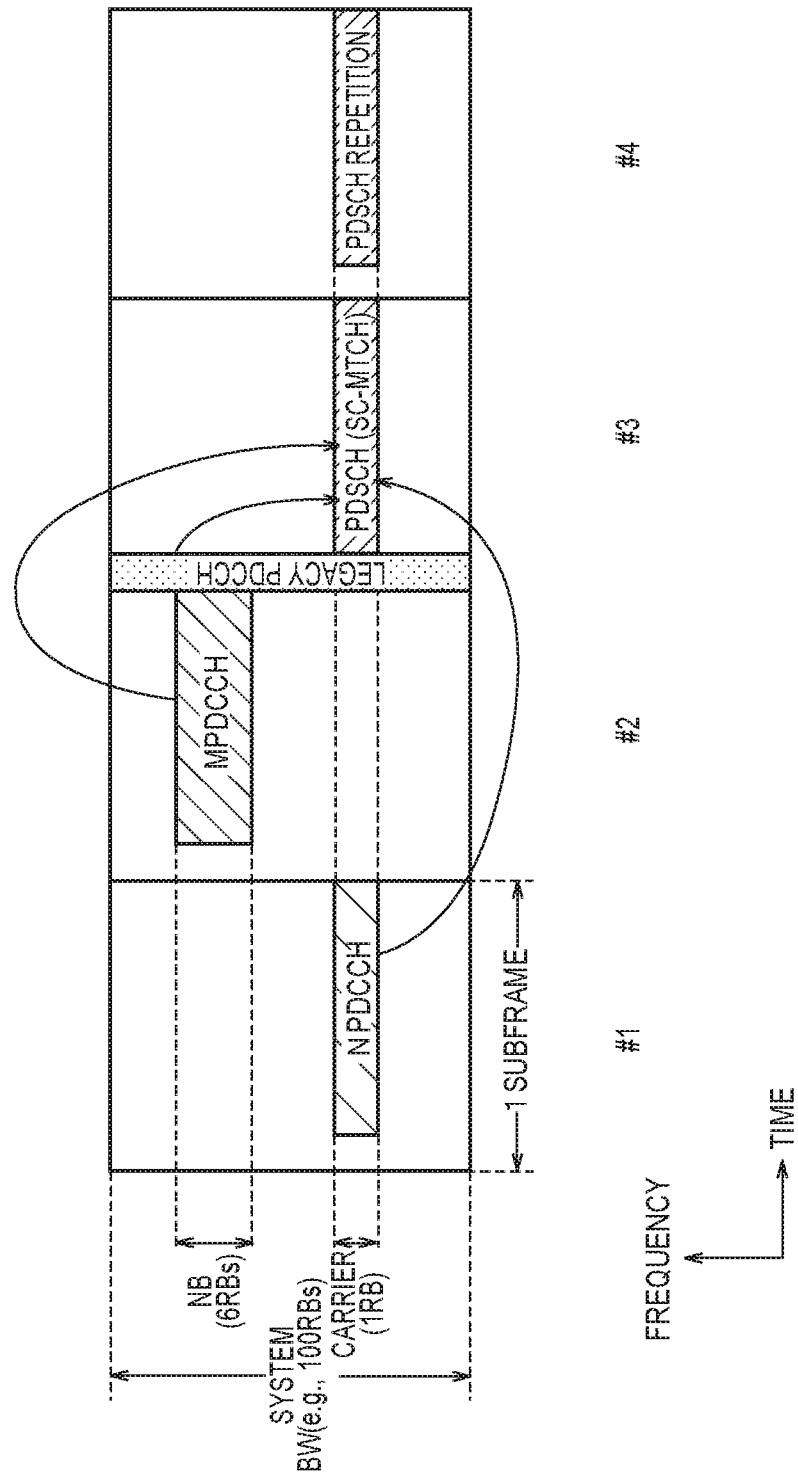
FIG. 20 is a diagram illustrating an operation example of PDSCH scheduling according to the third embodiment.

FIG. 20 is a diagram illustrating an operation example of PDSCH scheduling according to the third embodiment. In FIG. 20, an example of using MPDCCH being PDCCH for the eMTC UE, and NPDCCH being PDCCH for the NB-IoT UE is illustrated, but it is not absolutely necessary to use the MPDCCH and the NPDCCH (see the first embodiment).

As illustrated in FIG. 20, in the time direction, the eNB 200 schedules the PDSCH corresponding to the SC-MTCH in subframe #3. In the frequency direction, the eNB 200 schedules the bandwidth of the UE 100-3 (NB-IoT UE), that is, one resource block (RB) as PDSCH resource.

Here, since the UE 100-1 (general UE) also has to perform narrowband reception, a large scheduling delay can occur for the UE 100-1 (general UE). Therefore, when performing PDSCH scheduling as illustrated in FIG. 20, the eNB 200 preferably distributes data for which a delay is allowed by the SC-MTCH. As an example, the eNB 200 may, based on QCI (QoS Class Identity) specified from the MCE 11 (for each MBMS bearer), identify data for which a delay is allowed.

The UE 100-1 (general UE) receives the PDCCH (the Legacy PDCCH) for the general UE in the subframe #3, and receives the data using the PDSCH resource indicated by the PDCCH. The UE 100-2 (eMTC UE) receives the MPDCCH in subframe #2, and receives the data by using the PDSCH resource indicated by the MPDCCH. The UE 100-3 (NB-IoT UE) receives the NPDCCH in subframe #1, and receives the data by using the PDSCH resource indicated by the NPDCCH. It is noted that the correspondence of the subframe numbers in FIG. 20 is an example, and may be changed as appropriate.

The UE 100-2 (eMTC UE) and the UE 100-3 (NB-IoT UE) predict that the PDSCH will be scheduled in the subframe scheduled by the SC-MTCH scheduling information, and may start monitoring the PDCCH (MPDCCH/NPDCCH) before the subframe. The eNB 200 may transmit, to the UE 100-2 (eMTC UE) and the UE 100-3 (NB-IoT UE), information indicating the number of previous subframes from which the PDCCH monitoring is to be started. Alternatively, the eNB 200 may transmit, to the UE 100, information (such as the subframe information and the resource block information) indicating the scheduling of the MPDCCH and/or the NPDCCH. Such information may be transmitted by the SIB 20 or the SC-MTCH.

It is noted that as described in the first embodiment, if the SC-MTCH is transmitted by a scheme that does not use the MPDCCH and the NPDCCH, the eNB 200 may transmit information indicating the scheduling of the PDSCH resource (the subframe information and the resource block information, or the like) by the SIB 20 or the SC-MTCH. In this case, the eNB 200 may match the contents of the information with the contents of the PDCCH (the legacy PDCCH) for the general UE.

First Modification of Third Embodiment

In the current system specification, it is stipulated that the PDSCH transmission is started two subframes after the repetition of the MPDCCH ends. If two subframes are fixed in this manner, the PDSCH scheduling described in the third embodiment may not be appropriately performed. Therefore, it is desirable to make the interval from the end of repetition of the MPDCCH up to the start of the PDSCH transmission variable.

Figure 21:
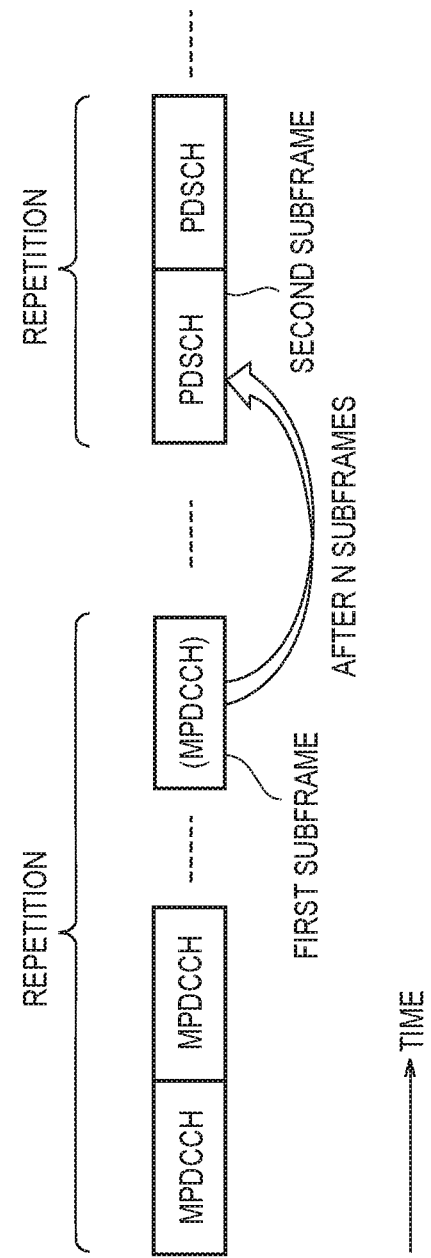
FIG. 21 is a diagram illustrating a first modification of the third embodiment.

FIG. 21 is a diagram illustrating a first modification of the third embodiment.

As illustrated in FIG. 21, the eNB 200 starts the repetition of the data (PDSCH) after the repetition of the control information (MPDCCH) over a plurality of subframes. In addition, the eNB 200 notifies the UE 100 of the actual repetition count of the MPDCCH, in the MPDCCH. Apart from this, the eNB 200 notifies the UE 100 of the maximum repetition count of the MPDCCH by RRC signaling.

The UE 100 receives the MPDCCH, and receives the PDSCH based on the received MPDCCH. The eNB 200 notifies the UE 100 of information (N) indicating the number of subframes from the first subframe in which the repetition of the MPDCCH is ended up to the second subframe in which the transmission of the PDSCH is started. The eNB 200 may notify N in the MPDCCH. Alternatively, the eNB 200 may notify N in the SIB 20, SC-MCCH, or another RRC signaling.

N may be a value of 3 or more. Also, N can take "1". In this case, since the start subframe immediately follows after the end subframe, it is preferable to apply N="1" only to the UE 100 with a high processing capability.

The first subframe may be a subframe in which the repetition of the MPDCCH is actually ended. In this case, the number of the second subframe is determined by using the actual repetition count notified in the MPDCCH. As an example, the number of the second subframe is determined by the "number of the initially transmitted subframe+the actual repetition count+N".

Alternatively, the first subframe may be a subframe in which the repetition of the MPDCCH is to be ended. In this case, the number of the second subframe is determined by using the maximum repetition count notified by RRC signaling. As an example, the number of the second subframe is determined by the "number of the initially transmitted subframe+the maximum repetition count+N".

The eNB 200 may notify the UE 100 of designation information designating whether the value of N is to be set as a fixed value (for example, "2") or as a variable value. The eNB 200 may notify the designation information in the MPDCCH. Alternatively, the eNB 200 may notify the designation information in the SIB 20, SC-MCCH, or another RRC signaling.

In the first modification of the third embodiment, a scenario in which the UE 100 is an eMTC UE is assumed, but a scenario in which the UE 100 is an NB-IoT UE may be assumed. In this case, the MPDCCH may be replaced with the NPDCCH.

Second Modification of Third Embodiment

The second modification of the third embodiment relates to handling of a downlink reference signal in a scenario in which UEs in various categories including an NB-IoT UE perform the SC-PTM reception.

The NB-IoT UE performs demodulation by using an NRS (a narrowband reference signal) that is a reference signal for the NB-IoT UE. However, the NB-IoT UE can perform demodulation by using a CRS (a cell-specific reference signal) in a predetermined operation mode.

The predetermined operation mode is a case (called "Inband operation") in which a carrier (one resource block) of the NB-IoT is allocated within the LTE system band, and the same cell ID is shared between the NB-IoT and the LTE (non-NB-IoT). Such an operation mode is called Inband-SamePCI. On the other hand, an operation mode being "Inband operation" and using different cell IDs between the NB-IoT and the LTE is called inband-DifferentPCI. These operation modes are informed from the cell by MasterinformationBlock-NB being a master information block for the NB-IoT.

The NB-IoT UE to which the Inband-Same PCI is notified as the operation mode may receive a CRS transmitted by using a predetermined antenna port, and may perform demodulation (such as the demodulation of the PDSCH, etc.) by using the CRS. On the other hand, the NB-IoT UE to which the Inband-DifferentPCI is notified as the operation mode receives an NRS transmitted by using an antenna port different from the predetermined antenna port, and performs demodulation by using the NRS.

Under such a premise, even if the Inband-DifferentPCI is notified as the operation mode, the NB-IoT UE performs the reception operation by assuming the Inband-Same PCI in the SC-PTM transmission (the PDSCH transmitting the SC-MTCH). In other words, the NB-IoT UE to which the Inband-Different PCI is notified as the operation mode performs demodulation by exceptionally using the CRS (that is, the same antenna port as the LTE and the same cell ID as the LTE), in the SC-PTM reception. Thereby, even in the case of the Inband-DifferentPCI, it is possible to facilitate the reception of the NB-IoT UE and the general UE (and/or the eMTC UE) with the same PDSCH resource. It is necessary for the NB-IoT UE to separately receive the cell ID (eutra-CRS-SequenceInfo) of the LTE, and to grasp the cell ID of the LTE.

In the case of SC-PTM application, demodulation with the CRS may be assumed as indispensable, and transmission and reception of the NRS may not be performed. In this case, the eNB 200 may arrange PDSCH instead of the NRS in the predetermined resource element in which the NRS is to be arranged. That is, resource element mapping may be assumed as common between the LTE and the NB-IoT.

The eNB 200 may notify information indicating whether or not the NB-IoT UE is to use the CRS for the demodulation of the SC-PTM. Such information may either be a direct indication or an implicit indication of whether or not the CRS is to be used. As an example, eutra-CRS-SequenceInfo may be used as an implicit indication by including the eutra-CRS-SequenceInfo into the SIB 20 or the SC-MCCH. If the eutra-CRS-SequenceInfo is notified in (the corresponding TMGI of) the SIB 20 or the SC-MCCH, the NB-IoT UE performs a reception operation in which the CRS is used for the demodulation of the SC-PTM.

Alternatively, it may be stipulated that the CRS can be used for the SC-PTM only when the operation mode is inband-SamePCI.

Fourth Embodiment

A fourth embodiment will be described while focusing on differences from the first to third embodiments below.

In the fourth embodiment, the UE 100 transmits and receives radio signals by using a limited frequency band limited to the bandwidth of a predetermined number of resource blocks. As described above, if the UE 100 is an eMTC UE, the limited frequency band is a "narrow band (NB)" limited to the bandwidth of six resource blocks. If the UE 100 is an NB-IoT UE, the limited frequency band is a "carrier" limited to the bandwidth of one resource block. If the UE 100 has the capability to simultaneously perform a unicast reception and the SC-PTM reception by using different limited frequency bands, the UE 100 transmits, to the eNB 200, capability information indicating that the UE 100 has the capability, by RRC signaling, for example. As a result, the eNB 200 can grasp whether or not the UE 100 in the new category supports simultaneous reception of the unicast and the SC-PTM, so that appropriate scheduling can be performed.

FIG. 22 is a diagram illustrating an example of simultaneous reception of the unicast and the SC-PTM according to the fourth embodiment.

Figure 22A:
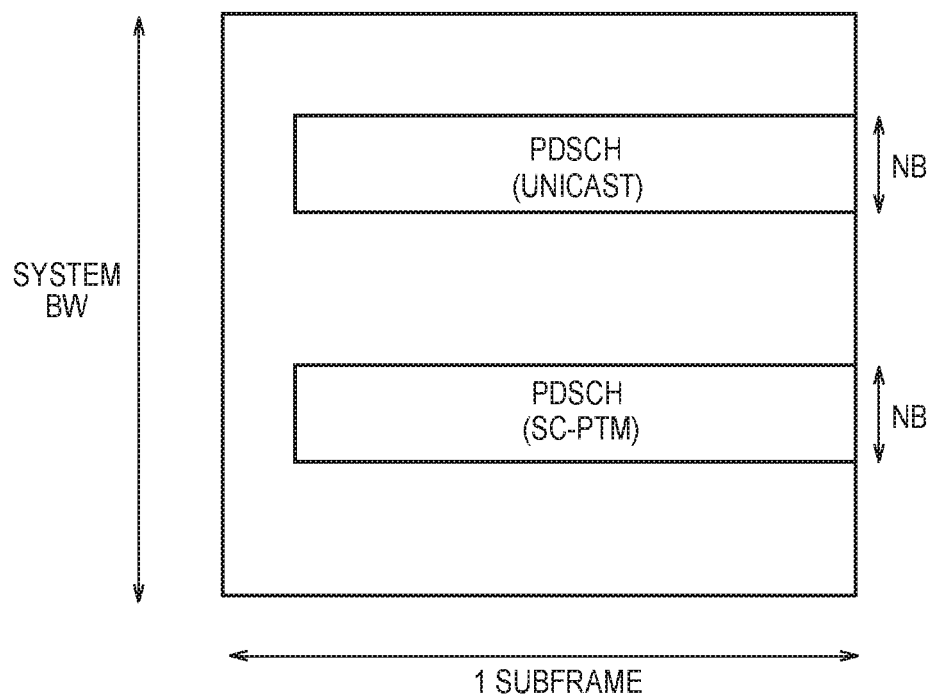
FIGS. 22A and 22B are diagrams illustrating an example of simultaneous reception of unicast and SC-PTM according to a fourth embodiment.

As illustrated in FIG. 22(a), the UE 100 (eMTC UE) may have the capability of performing the unicast reception and the SC-PTM reception by using two NBs within the same subframe. The PDSCH for the SC-PTM transmission (the SC-MCCH or the SC-MTCH) is assigned to one NB, and the PDSCH for the unicast transmission is assigned to the other NB. Hereinafter, such a reception is referred to as the "2-NB reception". The UE 100 (eMTC UE) transmits, to the eNB 200, capability information indicating that the UE 100 supports the 2-NB reception.

Figure 22B:
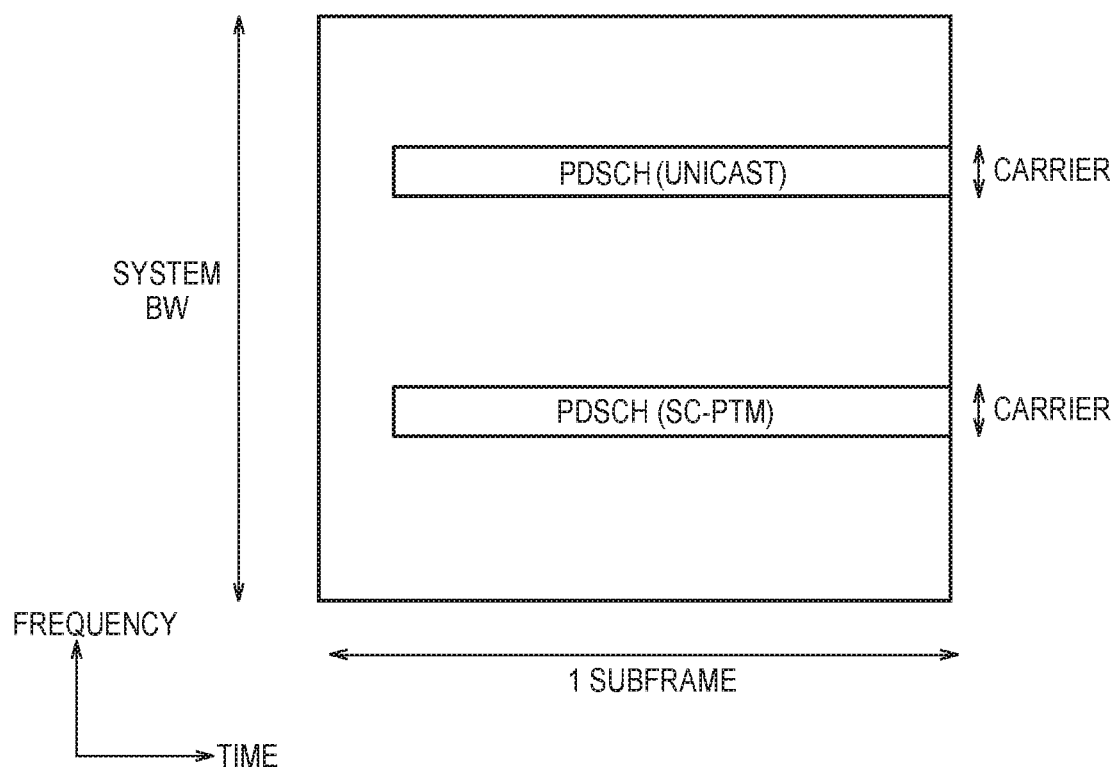

As illustrated in FIG. 22(b), the UE 100 (the NB-IoT UE) may have the capability of performing the unicast reception and the SC-PTM reception by using two carriers within the same subframe. The PDSCH for the SC-PTM transmission (the SC-MCCH or the SC-MTCH) is assigned to one carrier, and the PDSCH for the unicast transmission is assigned to the other carrier. Hereinafter, such a reception is referred to as the "2-carrier reception". The UE 100 (the NB-IoT UE) transmits, to the eNB 200, capability information indicating that the UE 100 supports 2-carrier reception.

scptm-ParallelReception that is capability information stipulated for the general UE may be used as capability information indicating that the UE 100 supports the 2-NB reception or the 2-carrier reception. The eNB 200 that receives the scptm-ParallelReception from the general UE determines that the general UE supports simultaneous reception of the unicast and the SC-PTM. The eNB 200 that receives the scptm-ParallelReception from the eMTC UE determines that the eMTC UE supports the 2-NB reception. The eNB 200 that receives the scptm-ParallelReception from the NB-IoT UE determines that the NB-IoT UE supports the 2-carrier reception. In order to make such a determination, the eNB 200 grasps the category of each UE by using the UE category information received from each UE.

Figure 23:
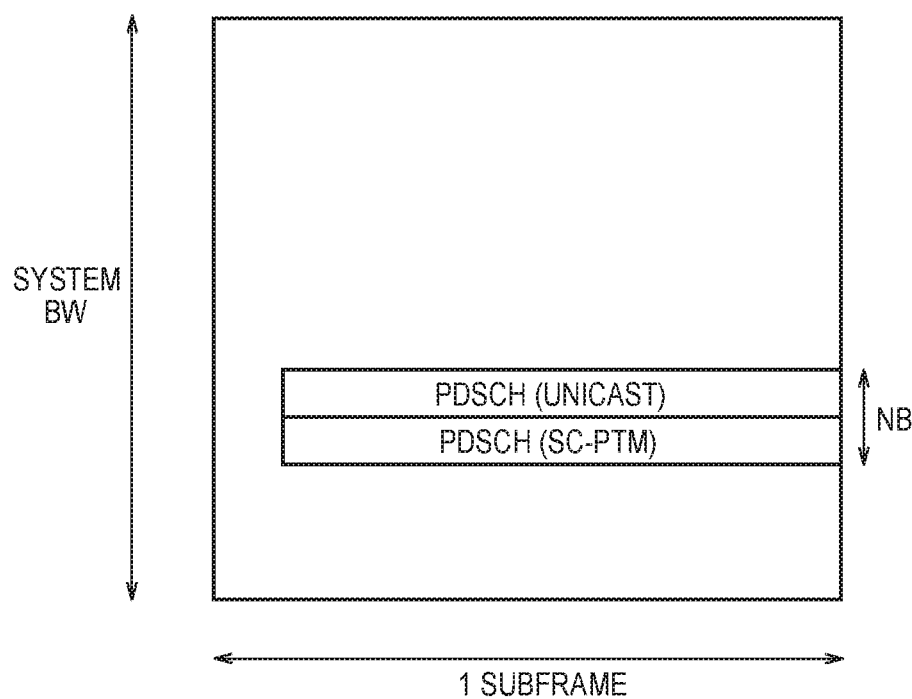
FIG. 23 is a diagram illustrating an example of simultaneous reception of unicast and SC-PTM in one NB according to the fourth embodiment.

However, the eMTC UE can simultaneously receive the unicast and the SC-PTM within one NB. FIG. 23 is a diagram illustrating an example of simultaneous reception of the unicast and the SC-PTM within one NB. As illustrated in FIG. 23, in the eMTC UE, the PDSCH for the SC-PTM transmission (the SC-MCCH or the SC-MTCH) is assigned to some resource blocks in the NB, and the PDSCH for the unicast transmission is assigned to the other resource blocks in the NB.

Therefore, as for the eMTC UE, it is desirable that the eNB 200 can grasp whether the simultaneous reception of the unicast and the SC-PTM can be performed in different NBs, or the simultaneous reception of the unicast and the SC-PTM can be performed in the same NB. Therefore, the capability information indicating that the simultaneous reception of the unicast and the SC-PTM can be performed in different NBs, and the capability information indicating that the simultaneous reception of the unicast and the SC-PTM can be performed in the same NB may be separately stipulated.

Fifth Embodiment

Fifth embodiment will be described while focusing on differences from the first to fourth embodiments below. In the fifth embodiment, a scenario in which no UE in a new category exists may be assumed. However, a scenario in which a UE in a new category exists may be assumed.

In the fifth embodiment, the eNB 200 transmits an access control signal for performing an access control either by broadcast or multicast. The eNB 200 may transmit the access control signal by an SIB. The UE 100 determines whether or not the access to the eNB 200 is controlled, based on the access control signal. The access control signal includes first information for controlling the access to the eNB 200 by a UE 100 that prioritizes the SC-PTM reception over the unicast communication.

As described above, the UE 100 can perform SC-PTM reception in either the RRC idle state or the RRC connected state. On the other hand, the UE 100 is required to be in the RRC connected state to perform the unicast communication. Therefore, if the eNB 200 is congested, the eNB 200 may release the connection with the UE 100 performing the SC-PTM reception in the RRC connected state so as to prioritize the UE 100 performing the unicast communication. Therefore, by transmitting the access control signal including the first information, the eNB 200 can prevent the UE 100, which prioritizes the SC-PTM reception, from connecting to the eNB 200 in advance.

FIG. 24 is a flowchart illustrating an operation example of the UE 100 according to the fifth embodiment.

As illustrated in FIG. 24, in step S501, the UE 100 receives an access control signal including the first information from the eNB 200.

In step S502, the UE 100 determines whether or not the UE 100 prioritizes the SC-PTM reception over the unicast communication.

If the UE 100 determines that the UE 100 prioritizes the SC-PTM reception over the unicast communication (step S502: YES), then in step S503, the UE 100 determines that the access to the eNB 200 (the cell) that has transmitted the access control signal is controlled, and avoids establishing a connection with the eNB 200 (the cell).

On the other hand, if the UE 100 determines that the UE 100 does not prioritize the SC-PTM reception over the unicast communication (step S502: NO), then in step S504, the UE 100 determines that the access to the eNB 200 (the cell) that has transmitted the access control signal is not controlled.

The access control signal may be applied only to the UE 100 supporting simultaneous reception of the SC-PTM and the unicast. Even if the UE 100 supports simultaneous reception of the SC-PTM and the unicast, but prioritizes the unicast over the SC-PTM, the UE 100 determines that the access is not controlled. It is noted that a UE 100 intending to perform only the unicast determines that the access is not controlled.

In the fifth embodiment, a scenario in which the MBMS service is distributed by the SC-PTM transmission is assumed, but a scenario in which the MBMS service is distributed by the MBSFN transmission may be assumed. In this case, the SC-PTM reception may be replaced with the MBSFN reception.

Modification of Fifth Embodiment

In the fifth embodiment, it is assumed that the eNB 200 prioritizes a UE 100 performing unicast communication. However, if the frequency or the cell in which the SC-PTM is provided is limited, the eNB 200 may prioritize the SC-PTM and avoid congestion due to the unicast communication.

Therefore, the eNB 200 may transmit an access control signal including the second information for controlling the access to the eNB 200 by a UE 100 that prioritizes the unicast communication over the SC-PTM reception. The access control signal including the second information may be regarded as a signal indicating that the network (the eNB 200) does not recommend the simultaneous reception of the SC-PTM and the unicast. Since the frequency or the cell in which the SC-PTM is provided is congested accordingly, the eNB 200 notifies the UE 100, by the access control signal, that the unicast is desired to be avoided. If the UE 100 that receives the access control signal including the second information prioritizes the unicast communication over the SC-PTM reception, the UE 100 determines that the access to the eNB 200 (the cell) that has transmitted the access control signal is controlled, and avoids establishing a connection with the eNB 200. In this case, the UE 100 may search for another cell other than the cell and try to connect to the other cell. On the other hand, the UE 100 that prioritizes the SC-PTM determines that the access to the eNB 200 (the cell) that has transmitted the access control signal is not controlled.

Other Embodiments

In the above-described embodiments, the "CE level" is mainly described, but the "CE level" may be replaced with the "repetition count".

In the above embodiment, a scenario in which the MBMS service is distributed by the SC-PTM transmission has mainly been described. However, the operation according to the above-described embodiment may be applied to a scenario in which the MBMS service is distributed by the MBSFN transmission.

Each of the above-described embodiments may be implemented independently; two or more embodiments may be combined and implemented. For example, a part of the processing according to one embodiment may be added to another embodiment. Alternatively, the part of the processing according to one embodiment may be replaced by a part of the configuration of another embodiment.

In the above-described embodiments, the LTE system is exemplified as the mobile communication system. However, the present invention is not limited to the LTE system. The present invention may be applied to a mobile communication system other than the LTE system.

[Supplementary Note 1]
(1) Introduction

In this supplementary note, the details of RRC configuration are discussed.

(2) Discussion
(2.1) Basic Configuration for SC-MTCH Reception
(2.1.1) Provisioning Scheme In Rel-13, SIB20 and SC-MCCH were applied for the SC-PTM provisioning, i.e., SIB20 provides the configuration for SC-MCCH reception and SC-MCCH provides the detailed configuration for SC-MTCH reception as also referred in section 5 (Annex). The "two-step configuration" scheme was introduced to fulfil the latency requirements of MCPTT, i.e., SC-PTM configuration acquisition in 40/80 ms to reduce the delays upon call setup and joining an on-going call, without frequent repetition/modification of system information.

Observation 1: Rel-13 SC-PTM adopts SC-MCCH to fulfill the latency requirement of MCPTT and to minimize the impact on system information repetition/modification.

The Rel-13 scheme could be no doubtful to be reused as a baseline for Rel-14 multicast enhancements, for eNB-IoT and FeMTC. And it was agreed "To use SIB20 (or a somewhat modified variant) for SC-MCCH configuration (a new SIB20-NB for NB-IoT)". This scheme also has a beneficial from the perspectives of flexibility and applicability, even when delay-sensitive applications will be identified in the future.

Observation 2: Rel-13 configuration scheme, i.e., by SIB20 and SC-MCCH, is reused for Rel-14 multicast enhancements.

It should be further discussed whether any optimization is necessary specific for FeMTC/eNB-IoT use cases, i.e., "firmware or software updates, group message delivery". The three optimizations were proposed;

Semi-Static Resource Allocation:

This optimization works for SC-MCCH and/or SC-MTCH transmission on semi-statically allocated resources. It could be assumed that the PDSCH conveying SC-MCCH and/or SC-MTCH would be transmitted on subframe occasions, which are static at least during the modification periods of SI and/or SC-MCCH, provided by e.g., SIB20 and/or SC-MCCH, and could be decoded without PDCCH reception. With the assumption, it would be beneficial to reduce UE's power consumption due to SC-PTM reception. For example, the Rx active duration could be reduced by ½ reception time, since the UE don't need to continuously monitor MPDCCH (or NPDCCH) to find out if SC-PTM transmissions are sent in PDSCH. Also, with this optimization the standardization efforts in the other WG may be avoided since SC-RNTI and/or G-RNTI is no longer necessary to receive PDSCH conveying SC-MCCH and/or SC-MTCH, i.e., MPDCCH/NPDCCH does not need to adopt these RNTIs. However, the drawback is less spectrum efficiency compared to the dynamic scheduling allowed in Rel-13 scheme.

Note that this optimization is applicable to FeMTC/eNB-IoT use cases, since these may be assumed as a delay-tolerant access and have definitely different requirement from the MCPTT in Rel-13.

"One-Step" Configuration:

This optimization eliminates SC-MCCH, i.e., SIB20 directly provides SC-PTM configuration. It also eliminates the change notification with SC-N-RNTI since this optimization could reuse the existing SI change notification and be beneficial from UE power saving point of view. In addition, the signalling overhead could be reduced overall, since the SC-MCCH configuration, i.e., the contents of SIB20, is no longer necessary to be broadcasted. The drawback is that the message size of SIB20 itself will increase due to SC-MCCH Configuration provisioning, and there is the limitation in the number of SI updates, i.e., no frequent changes of multicast configuration should be assumed.

Note that it's also applicable to FeMTC/eNB-IoT use cases as the same reason with above.

Multiple SC-MCCHs:

This optimization would allow the association between SC-MCCH and CE level (e.g., the number of repetitions). It could be assumed for example, one SC-MCCH associated with CE level 1 provides SC-PTM configurations associated with the same CE level, and another SC-MCCH associated with CE level 2 is for SC-PTM configurations with CE level 2. With the assumption, it may be beneficial to improve spectrum efficiency and UE power saving. Some further optimizations may be considered, e.g., a combination with the semi-static resource allocation to minimize (or eliminate) the number of SC-RNTI used for multiple SC-MCCHs transmissions. This concept may be reused for SIB20, i.e., multiple instances of SIB20, even if SC-MCCH is no longer necessary with e.g., "one-step" configuration above.

With the observations above, the optimizations is beneficial and applicable specific for FeMTC/eNB-IoT. Also, these could be jointly used for further optimization of NW flexibility and UE's power consumption. The standardization efforts would be necessary for e.g., switching between the agreed scheme and the optimizations in SIB20 as exampled in (b) of FIG. 15, but be expected not too big if Rel-13 configuration/concept may be reused for the baseline. So, the optimization should be considered but later after the basic scheme is built.

Proposal 1: RAN2 should later consider to introduce an integrated optimization based on the semi-static resource allocation, "one-step" configuration without SC-MCCH and multiple MCCHs, as a plug-in onto the basic configuration scheme, i.e., the reuse of Rel-13 scheme with necessary extensions.

(2.1.2) DRX

The DRX should be considered to adjust the intention of FeMTC/eNB-IoT, i.e., to minimize UE's power consumption. In Rel-13 SC-PTM, before the UE receives DL multicast data, it needs to acquire SIB20 to know the occasions of SC-MCCH transmission, wherein SC-MCCH conveys the detailed information for SC-PTM reception, i.e., SC-MTCH-InfoList, such as TMGI, corresponding G-RNTI, SC-PTM scheduling information and so on.

The current upper bound of SC-MCCH modification period is about 10.92 minutes, i.e., rf65536. So the UE interested in SC-PTM needs to check whether the contents of SC-MCCH has changed at least once every 10.92 minutes even if it has already received the current SC-MCCH, i.e., to try receiving the SC-MCCH change notification (PDCCH scrambled with SC-N-RNTI). On the other hand, Rel-13 eDRX extends the idle mode DRX cycle up to 43.69 munities. While it could be assumed that FeMTC UEs are configured with the eDRX cycle, if the UE is interested in SC-PTM reception then it cannot take full advantage of the benefits of eDRX from the power saving perspective.

The UE monitors the SC-RNTI in the PDCCH to obtain the SC-MCCH transmission in the DL-SCH. The SC-MCCH provides the list of all MBMS services with on-going sessions transmitted on SC-MTCH(s), including for each MBMS service TMGI and optional session ID, associated G-RNTI and scheduling information. When the TMGI of interest is available in SC-MCCH, the UE monitors PDCCH scrambled with G-RNTI, i.e., SC-PTM in the subframe occasions. The current scheduling period of SC-PTM is defined up to 8,192 ms, i.e., sf8192, so the UE needs to decode PDCCH once every 8 seconds, which is much shorter period compared to the eDRX cycle.

The IDLE UE interested in SC-PTM reception may need to decode PDCCH scrambled with SC-N-RNTI and/or G-RNTI in a much shorter period than its configured eDRX cycle.

In order to avoid the additional power consumption of FeMTC UEs, it should be discussed whether the SC-MCCH change notification mechanism and/or SC-PTM scheduling period needs to be extended, e.g., to align with eDRX mechanisms using H-SFN.

Observation 3: RAN2 should discuss whether the SC-MCCH change notification and SC-PTM scheduling period needs to be extended, in order to minimize the UE power consumption.

(2.1.3) SC-MCCH Change Notification

It needs to consider how SC-MCCH change notification is performed, since it's already agreed "To use SIB20 (or a somewhat modified variant) for SC-MCCH configuration (a new SIB20-NB for NB-IoT)", regardless of Proposal 1. In Rel-13 SC-PTM, it's notified by PDCCH scrambled with SC-N-RNTI, which is transmitted within SC-MCCH occasions. At the same time, Direct Indication is introduced to notify e.g., SI update for eMTC and NB-IoT, which is transmitted within the paging occasions. So, the two candidates are available to be reused for Rel-14 SC-MCCH change notification mechanism.

With Rel-13 SC-PTM notification, the UE needs to decode SC-N-RNTI and SC-RNTI simultaneously since the SC-MCCH change notification is transmitted in the same subframe occasion with SC-MCCH, which may not be necessary for FeMTC/eNB-IoT use cases. On the other hand, Rel-13 eMTC/NB-IoT notification mechanism is already optimized for these use cases. So, Direct Indication is preferable to be reused for SC-MCCH change notification in Rel-14.

Proposal 4: RAN2 should extend Direct Indication mechanism for SC-MCCH change notification.

(2.1.4) Narrowband/Carrier Information

RAN2#95 agreed that "Both SC-MCCH and SC-MTCH can maybe be scheduled on anchor carrier and/or non-anchor carrier for NB-IoT" and "SC-MCCH and SC-MTCH can maybe be scheduled on different carriers for NB-IoT and for MTC (narrowband for MTC)". So, the SC-MCCH/SC-MTCH may be transmitted somewhere within the system bandwidth and it's not realistic the UE searches where the SC-MCCH/SC-MTCH of interest is transmitted, from the perspective of power consumption. As it already observed, the narrowband/carrier information, i.e., on which PRB/carrier the SC-MCCH/SC-MTCH is scheduled, should be broadcasted, e.g., in SIB20.

Proposal 4: RAN2 should discuss if the narrowband/carrier information, i.e., on which PRB/carrier SC-MCCH/SC-MTCH is scheduled, should be broadcasted.

Somewhat related to this topic, RAN2 agreed that "Need to consider frequency hopping for MTC". The frequency hopping may be useful also for multicast as it is for Unicast, since the reception error due to frequency selective fading is reduced in general by the frequency hopping (and error correcting code etc.) from one UE's perspective (Unicast), and the same may be said for multiple users (multicast). But it needs to be discussed based on RAN1's decision, e.g., on how much gain is observed in multicast case.

Proposal 4: Consideration of frequency hopping needs to wait for input from RAN1.

(2.2) Service Continuity

It was agreed in RAN2#95 that "Service continuity of multi-cast should be supported as in Rel-13 for Idle mode for NB-IoT and MTC". In the current specification, SC-MCCH provides the neighbour cell information in SCPTM-NeighbourCellList, i.e., physical cell ID and frequency. If the UE is interested in a TMGI of which the serving cell does not provide SC-PTM, the UE needs to decode the neighbour cells' SC-MCCHs to seek the TMGI of interest.

With the existing solution intended for for Rel-13 MCPTT, UE's power consumption would be significantly impacted if the UE also needs to decode SC-MCCH over neighbour frequencies. esp. for FeMTC/eNB IoT UEs in mobility which is one of the enhancements to be addressed in this WI. So, it's worth discussing to optimize the service continuity with some additional assistance from the NW, in order to facilitate FeMTC/eNB-IoT UEs mobility with low power consumption.

Observation 5: Rel-13 service continuity for MCPTT UEs may need to be optimized for FeMTC/eNB-IoT UEs, in terms of UE's power consumption.

In the study phase of SC-PTM, the five solutions were identified for the UE moving from a SC-PTM cell to another SC-PTM cell as follows; Solutions 1, 2 and 3 are primarily for the case when SC-PTM in CONNECTED is supported. Solution 4 can be applicable for either ILDE or CONNECTED, while Solution 5 is only applicable to IDLE.

Solution 1: UE implementation. The UE can request to receive the group call over unicast when the SC-PTM reception quality is degraded below a threshold (threshold based on e.g. RSRQ, BLER). The threshold may be UE implementation specific, or be defined as part of the GCSE/MCPTT application in the UE. Such a solution was agreed in Rel-12 GCSE for group call over MBSFN.

Solution 2: eNB assisted unicast bearer request. This solution is similar to the UE implementation specific solution, and the difference is that eNB will provide trigger criteria (e.g. RSRQ or BLER threshold) to the UE to assist the UE in requesting unicast bearer for the group call at an appropriate point in time.

Solution 3 (RRC_CONNECTED only): Provision of neighbouring cell SC-PTM control info during handover. The SC-PTM control info of the target cell, if present, could be provided to the UE by handover command, thus service interruption caused by the acquisition of target cell SC-PTM control info after handover could be avoided.

Solution 4: Broadcast of neighbouring cell SC-PTM control info. One cell could broadcast the SC-PTM control info of the neighbour cells, so that the service interruption caused by the acquisition of target cell SC-PTM control info after cell reselection or handover could be eliminated.

Solution 5 (RRC_IDLE only): eNB assisted RRC connection establishment. The eNB will broadcast trigger criteria (e.g. RSRP or RSRQ) to assist the UE to perform the RRC connection establishment when the UE is about to move out of the SC-PTM cell coverage. Subsequently, solution 3 is applied.

For RRC_CONNECTED UEs, solution 3 is considered the most suitable solution. For RRC_IDLE UEs, solution 4 or solution 5 may be considered but have not been evaluated in terms of efficiency and feasibility. The overhead due to solution 4 was not evaluated (Note 1).

Considering the UE power saving and the agreement "Reception of multi-cast in RRC_IDLE mode is required by both NB-IoT and MTC", the most suitable solution is Solution 4, i.e., "Broadcast of neighbouring cell SC-PTM control info", since the UE continues SC-PTM reception in RRC IDLE without decoding SC-MCCH of neighbour cell. However, the significant overhead of the serving cell's SC-MCCH would be the issue, as implied in NOTE 1, which has more significant impacts in the narrowband or one carrier operation. Anyway, the trade-off could be seen between NW signalling overhead (i.e., level of NW assistance) and UE power consumption.

Observation 6: There is a trade-off between UE power consumption and NW signalling overhead, and the solutions in SC-PTM TR may not be the best for FeMTC/eNB-IoT.

The existing information provided for service continuity is scptm-NeighbourCellList within SC-MCCH, which was intended for LTE UEs, not for eMTC/NB-IoT UEs operated within the reduced bandwidth, i.e., 6 PRBs and 1 PRB respectively. So, the additional assistance is necessary to inform of whether the neighbour cells operate SC-PTM within the reduced bandwidth, in order to ensure the same grade of Rel-13 service continuity.

Proposal 5: RAN2 should consider whether the reduced bandwidth information is additionally broadcasted, i.e., whether the neighbour cell provides SC-PTM within 6 PRBs/1 PRB, for the basic function of service continuity.

For further optimization, it's beneficial to move the most essential information defined in SC-MCCH to SIB20, in order to minimize the UE power consumption. For example, it's effective for the UE to be allowed to receive only the configuration of interest. In this sense, the SC-PTM scheduling information and TMGIs of neighbour cells could work as additional assistances for UE power saving. The other assistances are FFS.

Proposal 6: RAN2 should consider if the SC-PTM scheduling information and/or TMGIs of neighbour cells are broadcasted by the serving cell as additional assistances for service continuity optimization.

(2.3) One-Shot Multicasting

The use case of firmware/software update is the multicast-type service rather than the broadcast service. It could be also assumed that the firmware is a (set of) file(s), so it would be not efficient that the same firmware is multicasted many times. In the current MBMS service, it's assumed that "the application/service layer provides for each service the TMGI, the session start and end time, the frequencies and the MBMS service area identities" in the USD. This will potentially allow for one-shot multicasting, i.e., the one firmware is multicasted only once, by configuration appropriate start/end time in the USD. However, it has been assumed that the USD isn't downloaded frequently at the UE while the scheduled firmware update happens dynamically. If the UE is required to download the USD frequently to know when the firmware may be updated this will have significant impact to the UE's power consumption. So, it is necessary to consider RAN-level optimizations, e.g., RAN-level information like the start/stop time including enhancements of Extended MCH Scheduling Information MAC Control Element, TMGI-based paging and so on, which may interact and complement with the UE's existing USD.

At least the start/stop time could be useful for UE battery saving, especially if SC-MCCH modification period is extended e.g., to align with eDRX cycle. With the RAN-level start/stop time information, the UE would wake-up only in the minimum duration for e.g., firmware delivery, even if the SC-PTM occasion is available i.e., SC-MTCH-SchedulingInfo.

Proposal 7: RAN2 should discuss whether RAN-level start/stop time information is introduced.

[Supplementary Note 2]

(1) Introduction

In this supplementary, the possibility and usefulness of backward compatible design for Rel-14 multicast enhancements are discussed, in addition to the commonality between FeMTC and eNB-IoT.

(2) Discussion

In RAN2#95, many of contributions suggested to ensure high commonalities between the multicast enhancements for FeMTC and eNB-IoT from the various perspectives such as architecture, control information, data transmission scheme and so on. In addition, there were also number of proposals/intentions to reuse Rel-13 SC-PTM mechanism as much as possible. As the result, a lot of agreements were taking into account the commonalities between FeMTC and eNB-IoT as well as between Rel-13 SC-PTM and Rel-14 enhancements, although the details may be different and should be FFS.

Observation 1: It's reasonable to ensure commonalities between FeMTC and eNB-IoT as well as between Rel-13 SC-PTM and Rel-14 multicast enhancements, as much as possible.

However, it was not yet discussed whether the multicast within a narrowband or carrier needs to ensure the backward compatibility to Rel-13 UEs, since it's likely a different kind of issue from one assumed in 3GPP's principle. Of course, it's not necessary for Rel-13 eMTC/NB-IoT UEs, i.e., Category M1/NB1, since these cannot receive SC-PTM. But it would be noticed there are Rel-13 SC-PTM capable UEs, e.g., Category 0, which may be also deployed for some IoT use cases and want to receive SC-PTM transmission enhanced in Rel-14. Such a design of the multicast enhancements is beneficial if it's the case that a common firmware/group message is delivered to Rel-13 SC-PTM UEs, Rel-14 FeMTC UEs and eNB-IoT UEs. For example, it's likely possible different devices with different UE categories may equip a common sensor or work for a same application.

It could be assumed that Rel-13 SC-PTM capable UE has more powerful than FeMTC/eNB-IoT UEs, i.e., wider bandwidth and better processor capability. So, it's potentially possible to receive the multicast transmission in a narrowband/carrier even if it's for e.g., "low complexity multicast functionality". As RAN2 agreed that "RAN2 assumes that the legacy SC-MTCH mechanism in which the SC-MTCH is scheduled by PDCCH is reused for multi-cast in NB-IoT and MTC to achieve flexible scheduling", SC-MTCH is assumed to be conveyed in PDSCH, which could be the common physical channel among Rel-13/Rel-14 UEs. The difference is which L1/L2 control channel schedules the PDSCH for SC-MTCH, PDCCH for Rel-13, MPDCCH for FeMTC or NPDCCH for eNB-IoT, while it's still FFS whether MPDCCH/NPDCCH is used for SC-PTM. If the same PDSCH could be pointed by multiple L1/L2 control channels as depicted in FIG. 20, all the UEs receive the same PDSCH conveying SC-MTCH regardless of their UE categories, i.e., legacy, FeMTC or eNB-IoT, as long as these are SC-PTM capable. Although the scheduling becomes more complex, it's beneficial for better spectral efficiency compared to allocating different PDSCHs for the same data. So, RAN2 should discuss whether to enable a NW implementation to coordinate SC-MTCH transmission for all types of UEs.

Observation 2: SC-MTCH transmission may be potentially coordinated for SC-PTM capable UEs with different UE category, by means of NW implementation.

Proposal 1: RAN2 should discuss whether the SC-MTCH transmission for eNB-IoT UEs should be designed as reception compatible to FeMTC UEs as well as Rel-13 SC-PTM capable UEs.

If Proposal 1 is agreeable, at least the DRX, i.e., the values of SC-PTM scheduling occasion/offset) should be aligned with Rel-13 or among FeMTC/eNB-IoT.

[Supplementary Note 3]
(1) Introduction

In this supplementary note, the necessity of SC-PTM reception for FeMTC UEs in RRC Connected is discussed.

(2) Discussion

In RAN2#95, it was suggested that the multicast reception in RRC Connected would increase UE complexity and power consumption. During the discussion, some specification impacts and less ability of FeMTC UE were assumed by companies, while difference between FeMTC and eNB-IoT was pointed out by others. It was also commented there was no discussion about use cases for the feature. These are worth considering in FFS whether FeMTC UE is allowed to receive SC-PTM in RRC Connected or not.

(2.1) Justification and Use Cases

The WID for FeMTC identifies the justification for Rel-14 enhancements of FeMTC as follows;

In Rel-13 the requirements of complexity reduction, extended battery life, and coverage enhancements aimed at devices such as sensors, meters, smart readers, and similar. Other types of devices/use cases, such as voice capable wearable devices and health monitoring devices share some of these requirements. However, a subset of these devices are not fully covered by the Rel-13 improvements because they require higher data rates above 1 Mbps, mobility, and they may support services that are more delay sensitive.

Although the statements above justifies mainly to support higher data rate, it should be noticed that the objective of Rel-14 FeMTC is not to enable lower complexity/power consumption but rather to support higher performance, in order to cover the use cases which was not aimed in Rel-13. It's totally different from the objective for Rel-14 eNB IoT, i.e., "to maintain the ultra-low cost and complexity" with additional features;

This work item starts from the Rel-13 NB-IoT design, and extends it to support some further features familiar from LTE which can be re-designed for NB-IoT to further increase the market impact, such as narrowband support for positioning and multi-cast. There are also enhancements to the Rel-13 techniques which will allow them to make more efficient use of the NB-IoT resources. These enhancements will be designed so as to maintain the ultra-low cost and complexity of the Rel-13 NB-IoT UE where appropriate, as well as the coverage and capacity of the NB-IoT network.

Observation 1: The WIDs identify different justifications between FeMTC and eNB-IoT, and it intends FeMTC to cover the use cases requiring higher performance.

One of promising use cases to be covered by FeMTC is voice streaming. So, the UE in RRC Connected is likely performing the streaming type of communication via Unicast, but if the UE is forced to transition to RRC IDLE to receive the firmware/group message via SC-PTM then the streaming session is released, which easily causes bad user experiences.

It may cause bad user experiences, if the communication via Unicast, e.g., a streaming session, is released in order to receive of SC-PTM, e.g., the firmware/group message.

For another example, it could be also expected to implement FeMTC for some real-time monitoring applications, such as surveillance camera or location tracking that may require continuous session during the firmware download. These use cases may be covered by Category 0 UEs [20] as suggested in the discussion during RAN2#95, but it's still beneficial to maintain the flexibility to adapt the cost-effective solution for such use cases from a UE vender point of view.

So, FeMTC UEs should have some options to adapt various use cases, such as e.g., a low power consumption-weighted device and a high performance-weighted equipment, while it's not necessary/justified for eNB IoT UEs. In addition, it's usually preferred for the eNB to have full control of the UEs with various options rather than relying on a UE-based mechanism, e.g., for load balancing.

Proposal 1: RAN2 should agree that FeMTC UE is optionally allowed to receive SC-PTM in RRC Connected.

(2.2) Specification Impacts

Rel-13 SC-PTM assumed it was up to UE capability whether to receive SC-PTM and Unicast simultaneously, i.e., scptm-ParallelReception-r13. When the capability is enabled, the UE may perform the parallel reception of DL-SCH in the same subframe. Since eMTC UE supports the reception within a narrowband, i.e., 6 PRBs, it's still possible for the eNB to schedule SC-PTM and Unicast with FDD manner, wherein it's different from NB-IoT UE since it only assumes the reception within a carrier, i.e., 1 PRB. Additionally, it's also possible by eNB implementation to schedule SC-PTM and Unicast with TDD manner considering 6 PRBs are available, i.e., a scheduling Unicast transmissions between discontinuous SC-PTM transmissions.

Observation 3: SC-PTM and Unicast may be scheduled for FeMTC UE in RRC Connected, under the favour of 6 PRBs operation.

In other words, the UE just doesn't transfer the capability bit, if the parallel reception is not supported, i.e., the same assumption with "Reception of multi-cast in RRC_CONNECTED mode is not required" for FeMTC UE.

Observation 4: Rel-13 SC-PTM already has the capability bit, scptm-ParallelReception-r13, to inform of whether the UE supports the parallel reception of SC-PTM and Unicast.

Regarding the other MBMS-related procedures, the MBMS Interest Indication is used to inform the eNB of the frequency of UE's interest. The original purpose of the message was for service continuity in RRC Connected, e.g., the handover decision according to the frequency of UE's interest based on SIB15. Even if SC-PTM reception is only allowed in RRC IDLE, the message is necessary for the eNB to determine whether to release the UE to IDLE, when a MBMS service starts. So, the MBMS Interest Indication is always necessary regardless of whether or not FeMTC UE is allowed to receive SC-PTM in Connected. Needless to say, the UE needs to acquire SIB15 as specified; thus, a bandwidth reduced version of SIB15, e.g., SIB15-BR, needs to be provided. These are the separate issues from the "FFS for MTC" identified in RAN2#95.

Observation 5: MBMS Interest Indication is necessary even if SC-PTM reception is only allowed in RRC IDLE, and the FeMTC UE (and even eNB-IoT UE) needs to acquire SIB15 in advance.

For the MBMS Counting procedure, it cannot be initiated for FeMTC UEs unless the system bandwidth is set to minimum (i.e., 1.4 MHz or 6 PRBs), since MBMSCountingRequest is only included in MCCH (not in SC-MCCH), whereby PMCH conveying MCCH is transmitted within MBSFN subframes and over entire system bandwidth, e.g., 10 MHz BW (50 PRBs) exceeds a narrowband (6 PRBs) and cannot be decoded by FeMTC UE. So, even when the eNB/MCE needs to initiate the MBMS Counting procedure for FeMTC UE, it may not be performed in some deployments, e.g., the FeMTC UEs (as well as eNB-IoT UEs) are served in a LTE frequency together with normal LTE UEs i.e., the "in-band operation" mode(s) in operationModeInfo-r13, and it's a separate issue from whether or not FeMTC UE is allowed to receive SC-PTM in Connected, while the UE in RRC Connected would be easier to support it.

Observation 6: MBMS Counting Request may not be able to be decoded by FeMTC UEs (and eNB-IoT UEs as well) in the "in-band operation" mode.

Therefore, from our specification point of view, there is no big/specific impact foreseen to allow FeMTC UE receives SC-PTM in RRC Connected.

Proposal 2: RAN2 should agree to reuse the capability, scptm-ParallelReception-r13, for FeMTC UE (with no specification impact).

The invention claimed is:

1. A mobile communication system, comprising:
a first radio terminal configured to transmit and receive a radio signal by using a limited frequency band limited to a bandwidth of a predetermined number of resource blocks;
a second radio terminal configured to transmit and receive a radio signal by using a frequency band wider than the limited frequency band; and
a base station configured to:
   transmit configuration information of SC-MTCH (Single Cell Multicast Traffic Channel), the SC-MTCH being a traffic channel for SC-PTM (Single Cell Point-To-Multipoint) transmission, by SC-MCCH (Single Cell Multicast Control Channel), the SC-MCCH being a control channel for the SC-PTM transmission,
   set a first period to the first radio terminal,
   set a second period shorter than the first period to the second radio terminal as an SC-MCCH change period in which the configuration information of the SC-MTCH can be changed,
   receive an MBMS (Multimedia Broadcast Multicast Service) interest indication from the first radio terminal, the first radio terminal being in a connected mode, and
   when the base station starts an MBMS service to the first radio terminal by the SC-PTM transmission, determine whether or not to shift the first radio terminal to an idle mode based on the MBMS interest indication.

2. A base station comprising:
a memory; and
at least one processor coupled to the memory, the at least one processor is configured to:
   transmit configuration information of SC-MTCH (Single Cell Multicast Traffic Channel), a traffic channel for SC-PTM (Single Cell Point-To-Multipoint) transmission, by SC-MCCH (Single Cell Multicast Control Channel), a control channel for the SC-PTM transmission,
   set a first period to a first radio terminal,
   set a second period shorter than the first period to a second radio terminal, as an SC-MCCH change period in which the configuration information of the SC-MTCH can be changed, the first radio terminal configured to transmit and receive a radio signal by using a limited frequency band limited to a bandwidth of a predetermined number of resource blocks, the second radio terminal configured to transmit and receive a radio signal by using a frequency band wider than the limited frequency band,
   receive an MBMS (Multimedia Broadcast Multicast Service) interest indication from the first radio terminal, the first radio terminal being in a connected mode, and
   when the base station starts an MBMS service to the first radio terminal by the SC-PTM transmission, determine whether or not to shift the first radio terminal to an idle mode based on the MBMS interest indication.

3. A mobile communication method comprising:
transmitting by a base station, configuration information of SC-MTCH (Single Cell Multicast Traffic Channel), a traffic channel for SC-PTM (Single Cell Point-To-Multipoint) transmission, by SC-MCCH (Single Cell Multicast Control Channel), a control channel for the SC-PTM transmission;

setting by the base station, a first period to a first radio terminal;

setting by the base station, a second period shorter than the first period to a second radio terminal, as an SC-MCCH change period in which the configuration information of the SC-MTCH can be changed, the first radio terminal configured to transmit and receive a radio signal by using a limited frequency band limited to a bandwidth of a predetermined number of resource blocks, the second radio terminal configured to transmit and receive a radio signal by using a frequency band wider than the limited frequency band;

receiving by the base station, an MBMS (Multimedia Broadcast Multicast Service) interest indication from the first radio terminal that is in a connected mode; and when the base station starts an MBMS service to the first radio terminal by the SC-PTM transmission, determining by the base station whether or not to shift the first radio terminal to an idle mode based on the MBMS interest indication.

4. The mobile communication system according to claim 1, wherein
the base station is further configured to when the base station determines that the first radio terminal can receive the SC-PTM transmission only in the idle mode, determine to shift the first radio terminal to the idle mode based on the MBMS interest indication.

5. The mobile communication system according to claim 1, wherein
the base station is further configured to:
receive, from the first radio terminal, capability information indicating whether the first radio terminal has capability to receive the SC-PTM transmission in the connected mode; and
when the base station determines that the first radio terminal can receive the SC-PTM transmission only in the idle mode based on the capability information, determine to shift the first radio terminal to the idle mode based on the MBMS interest indication.

* * * * *